(12) United States Patent
Cherkasova

(10) Patent No.: US 7,512,701 B2
(45) Date of Patent: *Mar. 31, 2009

(54) SYSTEM AND METHOD FOR EFFICIENTLY REPLICATING A FILE AMONG A PLURALITY OF RECIPIENTS IN A RELIABLE MANNER

(75) Inventor: Ludmila Cherkasova, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1086 days.

This patent is subject to a terminal disclaimer.

(21) Appl. No.: 10/345,587

(22) Filed: Jan. 16, 2003

(65) Prior Publication Data

US 2004/0143647 A1 Jul. 22, 2004

(51) Int. Cl.
*G06F 15/16* (2006.01)
(52) U.S. Cl. .................. 709/236; 709/217; 709/219; 709/231; 709/238; 709/248
(58) Field of Classification Search ................. 709/217, 709/219, 231, 236, 238, 248
See application file for complete search history.

(56) References Cited

U.S. PATENT DOCUMENTS

| | | | |
|---|---|---|---|
| 5,963,944 A | 10/1999 | Adams | |
| 6,205,445 B1 | 3/2001 | Tokuyama | |
| 6,230,251 B1 | 5/2001 | Batten et al. | |
| 6,233,252 B1 | 5/2001 | Barker et al. | |
| 6,269,080 B1 | 7/2001 | Kumar | |
| 6,397,251 B1 | 5/2002 | Graf | |
| 6,405,219 B2 | 6/2002 | Saether et al. | |
| 6,449,688 B1 | 9/2002 | Peters et al. | |
| 6,477,583 B1 * | 11/2002 | Zayas et al. | 709/248 |
| 6,493,877 B1 | 12/2002 | Yamazaki et al. | |
| 6,970,939 B2 * | 11/2005 | Sim | 709/236 |
| 7,174,334 B2 * | 2/2007 | Cherkasova | 707/10 |
| 7,200,598 B2 * | 4/2007 | Cherkasova | 707/10 |
| 2002/0083118 A1 | 6/2002 | Sim | |
| 2002/0083187 A1 | 6/2002 | Sim et al. | |
| 2004/0088380 A1 * | 5/2004 | Chung et al. | 709/219 |

OTHER PUBLICATIONS

Byers, J. et al., "Informed Content Delivery Across Adaptive Overlay Networks," Proc. of ACM SIGCOMM, 2002, pp. 1-14.
U.S. Appl. No. 10/345,716, Cherkasova.
U.S. Appl. No. 10/345,719, Cherkasova.
U.S. Appl. No. 10/345,718, Cherkasova.

* cited by examiner

*Primary Examiner*—Yves Dalencourt

(57) ABSTRACT

In accordance with one embodiment, a method of distributing a file from a first node to a plurality of recipient nodes comprises partitioning a file F into a plurality of subfiles. The method further comprises performing distribution of the file F to a plurality of recipient nodes using a distribution technique that comprises (a) attempting to distribute the plurality of subfiles from a first node to a first group of recipient nodes, and (b) the plurality of recipient nodes of the first group attempting to exchange their respective subfiles received from the first node. The method further comprises detecting a failed node, and the distribution technique adapting to distribute the file F to each non-failed node of the plurality of recipient nodes.

49 Claims, 9 Drawing Sheets

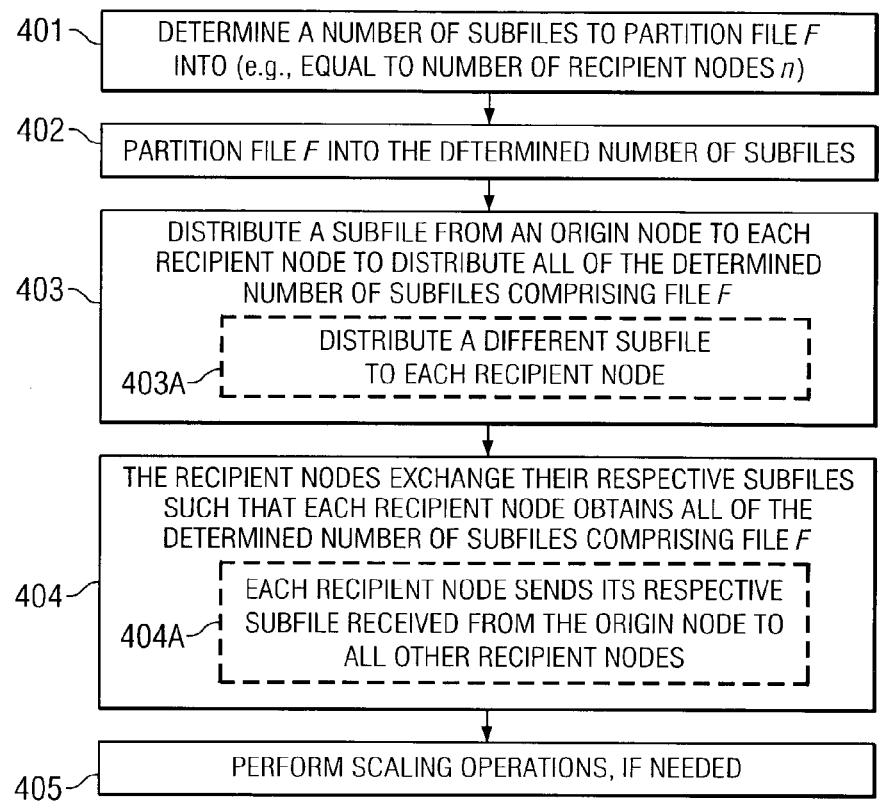
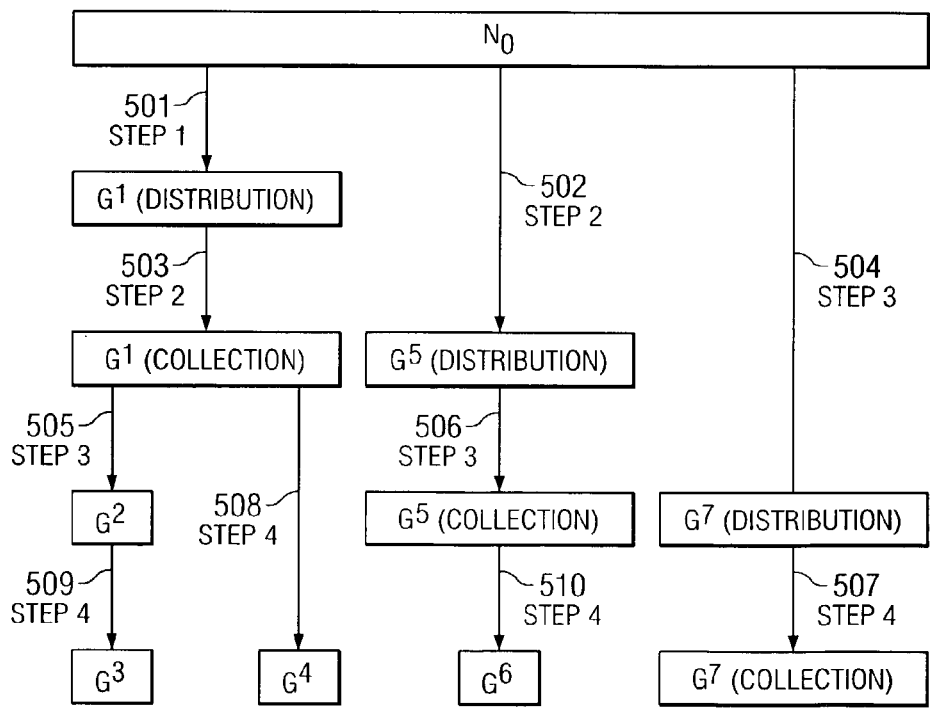

SYSTEM AND METHOD FOR EFFICIENTLY REPLICATING A FILE AMONG A PLURALITY OF RECIPIENTS IN A RELIABLE MANNER

CROSS-REFERENCE TO RELATED APPLICATIONS

This application is related to concurrently filed and commonly assigned U.S. patent application Ser. No. 10/345,716, filed Jan. 16, 2003, titled "SYSTEM AND METHOD FOR EFFICIENTLY REPLICATING A FILE AMONG A PLURALITY OF RECIPIENTS", which is now U.S. Pat. No. 7,174,334, concurrently filed and commonly assigned U.S. patent application Ser. No. 10/345,718, filed Jan. 16, 2003, titled "SYSTEM AND METHOD FOR EFFICIENTLY REPLICATING A FILE AMONG A PLURALITY OF RECIPIENTS HAVING IMPROVED SCALABILITY", which is now U.S. Pat. No. 7,200,598, and concurrently filed and commonly assigned U.S. patent application Ser. No. 10/345,719, filed Jan. 16, 2003, titled "SYSTEM AND METHOD FOR EFFICIENTLY REPLICATING A FILE AMONG A PLURALITY OF RECIPIENTS HAVING IMPROVED SCALABILITY AND RELIABILITY", which is now U.S. Pat. No. 7,454,424, the disclosures of which are hereby incorporated herein by reference.

FIELD OF THE INVENTION

The present invention relates in general to file distribution, and more specifically to systems and methods for efficiently distributing a file from a first node to a plurality of recipient nodes in a scalable and reliable manner that accounts for node failures.

DESCRIPTION OF RELATED ART

Today, much information is stored as digital data. Such information is often available to processor-based devices via client-server networks. Client-server networks are delivering a large array of information (including content and services) such as news, entertainment, personal shopping, airline reservations, rental car reservations, hotel reservations, on-line auctions, on-line banking, stock market trading, as well as many other services and types of content. Such information providers (sometimes referred to as "content providers") are making an ever-increasing amount of information available to users via client-server networks.

It is often desirable to communicate information to a plurality of different recipients. More particularly, it is often desirable to replicate a large file among a number of distributed computers. For instance, in some situations it is desirable for a plurality of distributed clients to receive a replicated file. For example, suppose a number of client computers comprise a software application program, and the application program's provider makes a modification or update to the program. The application provider may desire to distribute the software update to each of the client computers. As another example, a company may receive a new software program and desire to distribute the software program to all of its computers that are communicatively coupled to the company's Local Area Network (LAN) or Intranet.

As still another example, it may be desirable for a large file to be replicated among a plurality of distributed servers. For instance, as described further below, a plurality of distributed servers may be established for efficiently serving content to clients (e.g., each server may be responsible for a particular geographical region of clients), and it may be desirable to replicate a file from an originating server to the other distributed servers such that all of the servers provide the same content to their respective clients. For example, Content Delivery Networks (CDNs) are based on a large-scale distributed network of servers located closer to the edges of the Internet for efficient delivery of digital content, including various forms of multimedia content. The main goal of the CDN's architecture is to minimize the network impact in the critical path of content delivery as well as to overcome a server overload problem, which is a serious threat for busy sites serving popular content. CDNs implementing distributed content servers are becoming increasingly popular on the Internet, and particularly within the World Wide Web (the "web") portion of the Internet, for example, for serving content (web documents) to clients. Many edge servers may be implemented within the Internet (e.g., hundreds, thousands, or even hundreds of thousands of edge servers may be implemented) that are each to serve the same, replicated content to their respective clients.

For many web documents (e.g., html pages and images having a relatively small file size) served via CDN, active replication of the original content at the edge servers may not be needed. The CDN's edge servers act as caching servers, and if the requested content is not yet in the cache at the time it is requested by a client, the content is retrieved from the original server using the so-called pull model. The performance penalty associated with the initial document retrieval from the original server to the edge server serving the requesting client, such as higher latency observed by the client and the additional load experienced by the original server, is generally not significant for small to medium size web documents.

For large files (e.g., large documents, software download packages, and media files), a different operational mode is typically preferred. In this case, it is typically desirable to replicate these files at edge servers in advance of a client requesting them, using the so-called push model. For large files, actively replicating the files to a plurality of distributed edge servers is a challenging, resource-intensive problem, e.g., media files can require significant bandwidth and download time due to their large sizes: a 20 minute media file encoded at 1 Mbit/s results in a file of 150 Mbytes. If such a large file was not actively replicated to the edge servers in advance of a client requesting the file, a significant performance penalty may be incurred for retrieving the file from the original server, such as higher latency observed by the client and the additional load experienced by the original server in providing the large file to the edge server serving the requesting client. Sites supported for efficiency reasons by multiple mirror servers face a similar problem: the original content needs to be replicated across the multiple, geographically distributed, mirror servers.

BRIEF SUMMARY OF THE INVENTION

In accordance with one embodiment of the present invention, a method of distributing a file from a first node to a plurality of recipient nodes is provided. The method comprises partitioning a file F into a plurality of subfiles. The method further comprises performing distribution of the file F to a plurality of recipient nodes using a distribution technique that comprises (a) attempting to distribute the plurality of sub files from a first node to a first group of recipient nodes, wherein the first node attempts to communicate at least one subfile to each recipient node of the first group but not all of the plurality of subfiles to any recipient node of the first group, and (b) the plurality of recipient nodes of the first group attempting to exchange their respective subfiles received from the first node. The method further comprises detecting a failed node, and the distribution technique adapting to distribute the file F to each non-failed node of the plurality of recipient nodes.

In accordance with another embodiment, a system comprises a means for partitioning a file F into a plurality of subfiles. The system further comprises a means for performing distribution of the file F to a plurality of recipient nodes using a distribution technique that comprises (a) attempting to distribute the plurality of subfiles from a first node to a first group of recipient nodes, wherein the first node attempts to communicate at least one subfile to each recipient node of the first group but not all of said plurality of subfiles to any recipient node of the first group, and (b) the plurality of recipient nodes of the first group attempting to exchange their respective subfiles received from the first node. The system further comprises means for detecting a failed node, and the distribution technique adapting, responsive to the detecting means detecting a failed node, to distribute the file F to each non-failed node of the plurality of recipient nodes.

In accordance with another embodiment, a system comprises an origin node operable to partition a file F into a plurality of subfiles, wherein the plurality of subfiles correspond in number to a number of recipient nodes in a first group to which the file is to be distributed. The origin node is operable to attempt to distribute all of the plurality of subfiles to the recipient nodes, wherein the origin node attempts to distribute a different one of the plurality of subfiles to each of the recipient nodes. The recipient nodes are operable to attempt to exchange their respective subfiles received from the origin node such that each recipient node obtains all of the plurality of subfiles. The origin node is operable to detect a failed node in the first group, and the origin node is operable to manage distribution of the file F upon detecting a failed node in the first group in a manner such that every non-failed node of the first group receives the file F.

BRIEF DESCRIPTION OF THE DRAWINGS

FIG. 4 shows an example operational flow diagram for distributing a file from an origin node to a plurality of recipient nodes in accordance with an embodiment of the present invention;

FIG. 5 shows an example scaling technique for a file distribution process of an embodiment of the present invention;

DETAILED DESCRIPTION

Figure 1:
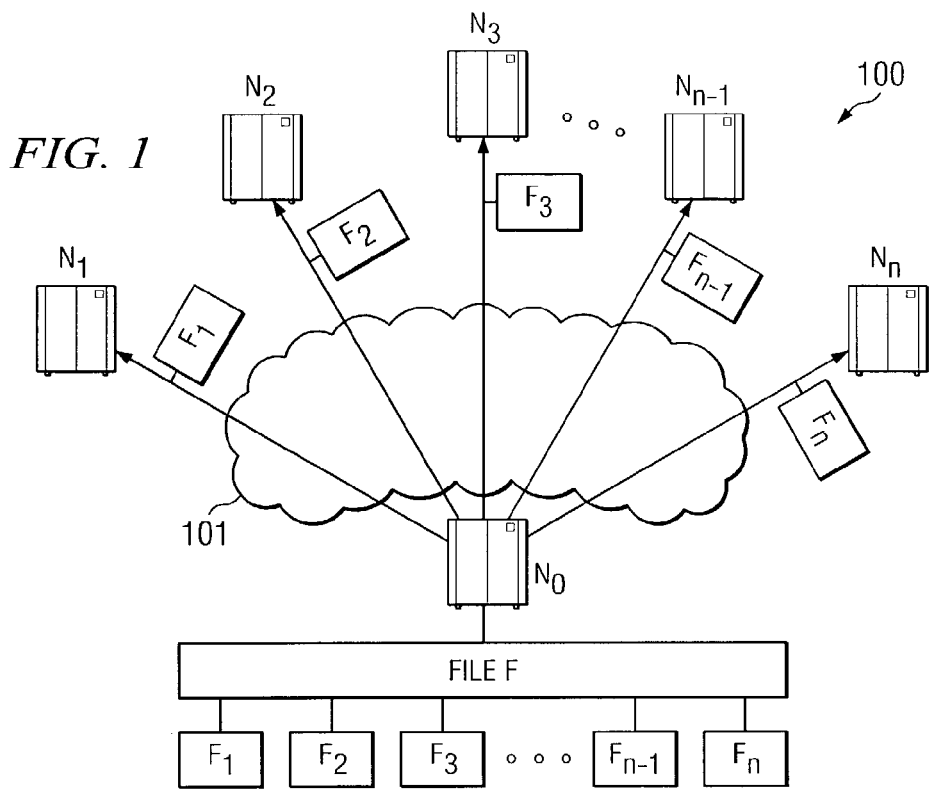
FIG. 1 shows an example environment in which embodiments of the present invention may be utilized and illustrates an example of distributing subfiles from an origin node to a plurality of recipient nodes in accordance with a file distribution technique of an embodiment of the present invention.

Various embodiments of the present invention are now described with reference to the above figures, wherein like reference numerals represent like parts throughout the several views. As described further below, embodiments of the present invention provide a system and method for distributing a file from a first node (which may be referred to herein as the "origin" node) to a plurality of recipient nodes. In certain embodiments, the plurality of recipient nodes comprise servers, such as edge servers in a CDN or mirror servers as examples. Of course, embodiments of the present invention may also be utilized for distributing a file to client nodes.

According to an embodiment of the present invention, a file distribution technique is provided that is scalable for application in distributing a file to a very large number of recipient nodes. For instance, embodiments of the present invention enable the recipient nodes to be logically organized into a plurality of different groups, with each group having a plurality of recipient nodes, and a file is efficiently distributed to the plurality of groups of recipient nodes.

According to one embodiment, the file to be distributed is partitioned into a plurality of parts (or "subfiles"), and the plurality of parts are distributed from the origin node to a first group of recipient nodes. More particularly, all of the subfiles comprising the file to be distributed are communicated from the origin node to the recipient nodes of the first group, but the origin node does not send all of the subfiles to each recipient node of the first group. That is, the origin node sends only a portion of the subfiles that comprise the file to be distributed to each recipient node of the first group. For instance, in one embodiment, each recipient node of the first group receives a different one of the subfiles of the file to be distributed. Thereafter, the recipient nodes of the first group exchange their respective subfiles with each other, thus resulting in each recipient node of the first group obtaining the full file. Accordingly, the origin node is not required to communicate the full file to each recipient node of the first group, but rather may communicate only a portion thereof to each recipient node of the first group, and those recipient nodes then exchange their respective portions to result in each recipient node of the first group obtaining all subfiles comprising the full file.

Various techniques may be implemented for distributing a file from an origin node to a first group of recipient nodes in the manner described above. One embodiment of the present invention implements a technique referred to herein as the FastReplica distribution technique. With FastReplica, to replicate a large file among a group of n recipient nodes, the original file F is partitioned into n subfiles of approximately equal size and each subfile is transferred from the origin node to a different node in the recipient group. That is, the subfiles are communicated to the recipient nodes from the origin node concurrently. Such transfer of the subfiles from the origin node to the recipient nodes is referred to herein as a "distribution" step. Thereafter, each/recipient node propagates its respective subfile (i.e., the subfile that it received from the origin node) to the remaining recipient nodes in the group. That is, each recipient node concurrently communicates its subfile to the other nodes of the group. This exchange of subfiles by recipient nodes is referred to herein as a "collection" step, as the recipient nodes each collect the subfiles comprising file F from the other recipient nodes. Thus, instead of typical replication of the entire file to n nodes by using n communication paths (e.g., Internet paths) connecting the origin node to the replication group, this FastReplica technique exploits n×n communication paths within the replication group where each path is used for transferring the $$\frac{1}{n}-th$$

portion of the file.

As mentioned above, embodiments of the present invention are scalable and enable distribution of a file to a plurality of groups of recipient nodes. Various distribution techniques may be utilized to enable the distribution of a file to a plurality of different groups of recipient nodes. In one implementation, an origin node distributes the subfiles comprising file F to a first group of recipient nodes, such as in the above-described distribution step of the FastReplica distribution technique. Thereafter, the recipient nodes of the first group exchange their respective subfiles, such as in the above-described collection step of the FastReplica distribution technique. While the first group performs this collection step, the origin node may perform a distribution of the subfiles comprising file F to a second group of recipient nodes. Thereafter, the recipient nodes of the second group exchange their respective subfiles, such as in the above-described collection step of the FastReplica distribution technique. While the second group performs this collection step, the origin node may perform a further distribution of the subfiles comprising file F to a third group of recipient nodes. Further, once the first group has performed the collection step, each of those nodes may establish a communication connection to each of the nodes of a fourth group of recipient nodes, and each node of the first group may communicate the subfile that it received from the origin node to each node of the fourth group. Thus, at the end of this distribution from the first group to the fourth group, each node of the fourth group has all of the subfiles comprising file F, and therefore do not need to perform a collection step within such fourth group. Such a distribution from the first group to the fourth group is referred to herein as a "group-to-group" distribution.

Embodiments of the present invention improve the robustness (or "reliability") of the above file distribution process to deal with node failures. As can be seen from the above description of FastReplica, for example, such FastReplica algorithm is sensitive to node failures. For example, if a node of a group fails during the collection step for the group, this event may impact all other nodes in such distribution group because each node depends on the other nodes of the group to receive the other nodes' respective subfiles. Embodiments of the present invention enable reliable distribution of a file to recipient nodes even if node failures are encountered. More particularly, techniques for detecting a node failure and detouring the distribution of the subfiles around such failed node are provided in an embodiment of the present invention.

To better appreciate aspects of embodiments of the present invention, it is appropriate to briefly review the existing techniques in the art for file distribution. Currently, the three most popular methods used for content distribution (or file "replication") in the Internet environment are: (1) satellite distribution, (2) multicast distribution, and (3) application-level multicast distribution.

With satellite distribution, the content distribution server (or the "origin node") has a transmitting antenna. The servers (or "recipient nodes") to which the content should be replicated (or the corresponding Internet Data centers, where the servers are located) have a satellite receiving dish. The original content distribution server broadcasts a file via a satellite channel. Among the shortcomings of the satellite distribution method are that it requires special hardware deployment and the supporting infrastructure (or service) is quite expensive.

With multicast distribution, an application can send one copy of each packet of a file and address it to the group of recipient nodes (IP addresses) that want to receive it. This technique reduces network traffic by simultaneously delivering a single stream of information to hundreds/thousands of interested recipients. Multicast can be implemented at both the data-link layer and the network layer. Applications that take advantage of multicast technologies include video conferencing, corporate communications, distance learning, and distribution of software, stock quotes, and news. Among the shortcomings of the multicast distribution method is that it requires a multicast support in routers, which still is not consistently available across the Internet infrastructure.

Since the native IP multicast has not received widespread deployment, many industrial and research efforts have shifted to investigating and deploying the application level multicast, where nodes across the Internet act as intermediate routers to efficiently distribute content along a predefined mesh or tree. A growing number of researchers have advocated this alternative approach, where all multicast related functionality, including group management and packet replication, is implemented at end systems. In this architecture, nodes participating in the multicast group self-organize themselves into a scalable overlay structure using a distributed protocol. Further, the nodes attempt to optimize the efficiency of the overlay by adapting to changing network conditions and considering the application-level requirements.

An extension for the end-system multicast is introduced by J. Byers, J. Considine, and M. Mitzenmacher in "Informed Content Delivery Across Adaptive Overlay Networks", *Proc. Of ACM SIGCOMM,* 2002, in which instead of using the end systems as routers forwarding the packets, the authors propose that the end-systems actively collaborate in an informed manner to improve the performance of large file distribution. The main idea is to overcome the limitation of the traditional service models based on tree topologies where the transfer rate to the client is defined by the bandwidth of the bottleneck link of the communication path from the origin server. The authors propose to use additional cross-connections between the end-systems to exchange the complementary content these nodes have already received. Assuming that any given pair of end-systems has not received exactly the same content, these cross-connections between the end-systems can be used to "reconcile" the differences in received content in order to reduce the total transfer time.

As mentioned above, embodiments of the present invention may implement a distribution technique referred to herein as the FastReplica distribution technique. Example embodiments implementing such FastReplica technique are described further below. Consider the following notations:

(a) Let $N_0$ be a node (which may be referred to as an "origin node" or "origin server") which has an original file F, and let Size(F) denote the size of file F in bytes; and (b) Let $R=\{N_1, \ldots, N_n\}$ be a replication set of nodes (i.e., a set of recipient nodes to which the file F is to be distributed).

The problem becomes replicating file F across nodes $N_1, \ldots, N_n$, while minimizing the overall replication time. In one embodiment, a relatively small group of recipient nodes $N_1, \ldots, N_n$ exist (e.g., a sufficiently small number of recipient nodes such that each node $N_0, \ldots, N_n$ can support concurrent communication connections to all of the other n−1 nodes, which is typically 30 or less recipient nodes). The FastReplica technique may be implemented for application to a relatively small number n (e.g., approximately 30 or less) of recipient nodes, wherein such an implementation may be referred to herein as "FastReplica in the Small." In this FastReplica in the Small technique, file F is divided into n equal subsequent subfiles: $F_1, \ldots, F_n$ where $$Size(F_i) = \frac{Size(F)}{n}$$

bytes for each i: $1 \leq i \leq n$.

The FastReplica in the Small algorithm then performs a distribution step in which origin node $N_0$ opens n concurrent network connections to nodes $N_1, \ldots, N_n$, and sends to each recipient node $N_i (1 \leq i \leq n)$ the following items:

(a) a distribution list of nodes $R=\{N_1, \ldots, N_n\}$ to which subfile $F_i$ is to be sent in the next step (each node $N_i$ is itself excluded from its distribution list); and (b) subfile $F_i$.

An example of this distribution step of the FastReplica algorithm is shown in FIG. 1. For instance, FIG. 1 shows an example environment 100 in which embodiments of the present invention may be utilized. Environment 100 comprises origin node $N_0$ and recipient nodes $N_1, N_2, N_3, \ldots, N_{n-1}, N_n$ that are communicatively coupled via communication network 101. Communication network 101 is preferably a packet-switched network, and in various implementations may comprise, as examples, the Internet or other Wide Area Network (WAN), an Intranet, Local Area Network (LAN), wireless network, Public (or private) Switched Telephony Network (PSTN), a combination of the above, or any other communications network now known or later developed within the networking arts that permits two or more computing devices to communicate with each other. In certain embodiments, nodes $N_0$-$N_n$ comprise server computers. For instance, nodes $N_1, \ldots, N_n$ may comprise edge servers in a CDN or mirror servers within a mirrored network. In other embodiments, nodes $N_0$-$N_n$ may comprise server and/or client computers. For example, node $N_0$ may comprise a server computer, and nodes $N_1, \ldots, N_n$ may comprise client computers to receive a file (e.g., software application file, etc.) from node $N_0$.

Origin node $N_0$ comprises file F stored thereto, and such file F is partitioned into n subfiles $F_1, F_2, F_3, \ldots, F_{n-1}, F_n$, wherein the sum of subfiles $F_1, F_2, F_3, \ldots, F_{n-1}, F_n$ comprise the total file F. As shown, the plurality of subfiles are distributed from origin node $N_0$ to the recipient nodes $N_1, \ldots, N_n$. More particularly, all of the n subfiles comprising file F are communicated from origin node $N_0$ to the recipient nodes $N_1, \ldots, N_n$, but origin node $N_0$ does not send all of the n subfiles to each recipient node. That is, origin node $N_0$ sends only a portion of the n subfiles to each recipient node. For instance, in this example, each recipient node receives a different one of the n subfiles from origin node $N_0$. More particularly, origin node $N_0$ communicates subfile $F_1$ to node $N_1$, subfile $F_2$ to node $N_2$, subfile $F_3$ to node $N_3, \ldots$, subfile $F_{n-1}$ to node $N_{n-1}$, and subfile $F_n$ to node $N_n$ via communication network 101. Additionally, in an embodiment of the present invention, origin node $N_0$ also sends a distribution list to each recipient node $N_1, \ldots, N_n$. The distribution list for each node identifies the other recipient nodes that such recipient node is to communicate the subfile that it received from origin node $N_0$. For example, origin node $N_0$ may send to node $N_1$ a distribution list identifying nodes $N_2, \ldots, N_n$. Similarly, origin node $N_0$ may send to node $N_2$ a distribution list identifying nodes $N_1$, and $N_3, \ldots, N_n$ and so on.

Figure 2:
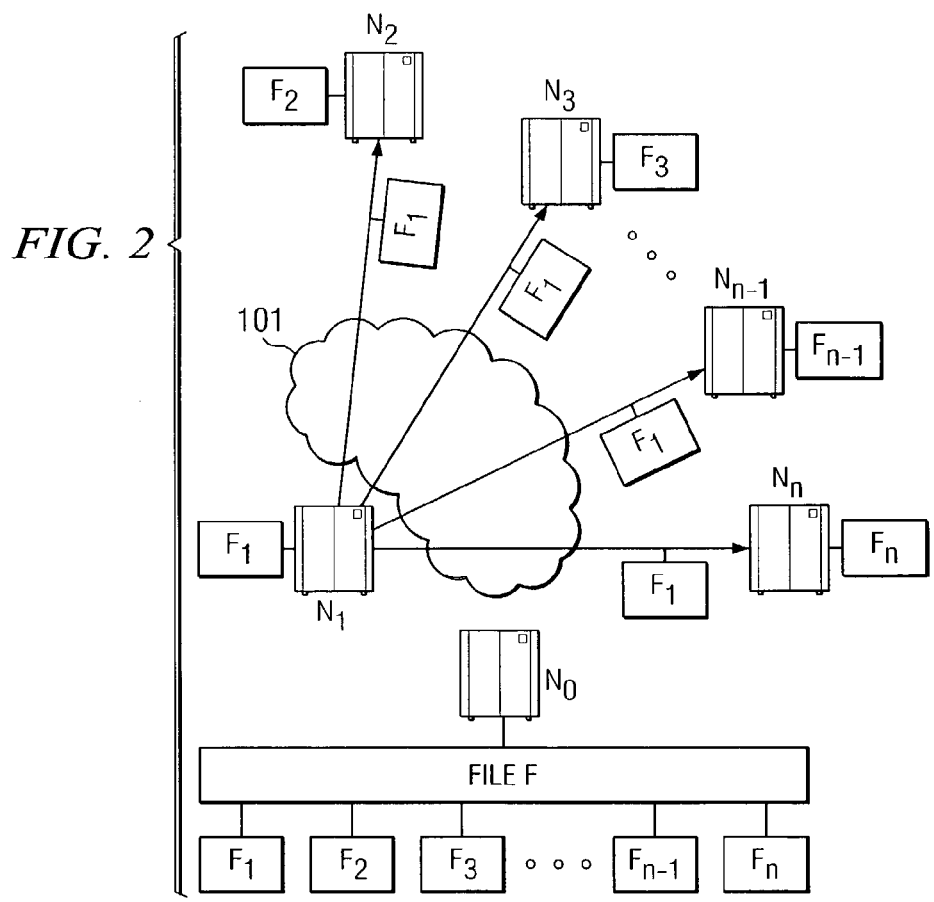
FIG. 2 shows an example of a recipient node communicating the subfile that it received from an origin node to other recipient nodes in accordance with the file distribution technique of FIG. 1.

The next step of the FastReplica algorithm is referred to herein as the collection step. An example of the collection step is described herein in conjunction with FIGS. 2 and 3. After receiving file $F_i$, node $N_i$ opens (n−1) concurrent network connections to remaining nodes in the recipient group and sends subfile $F_i$ to them, as shown in FIG. 2 for node $N_1$. More particularly, FIG. 2 shows that node $N_1$ opens n−1 concurrent network connections, i.e., one network connection with each of recipient nodes $N_2, \ldots, N_n$. Node $N_1$ communicates subfile $F_1$, which it received from origin node $N_0$ in the above-described distribution step, to each of the recipient nodes $N_{21}, \ldots, N_n$.

Figure 3:
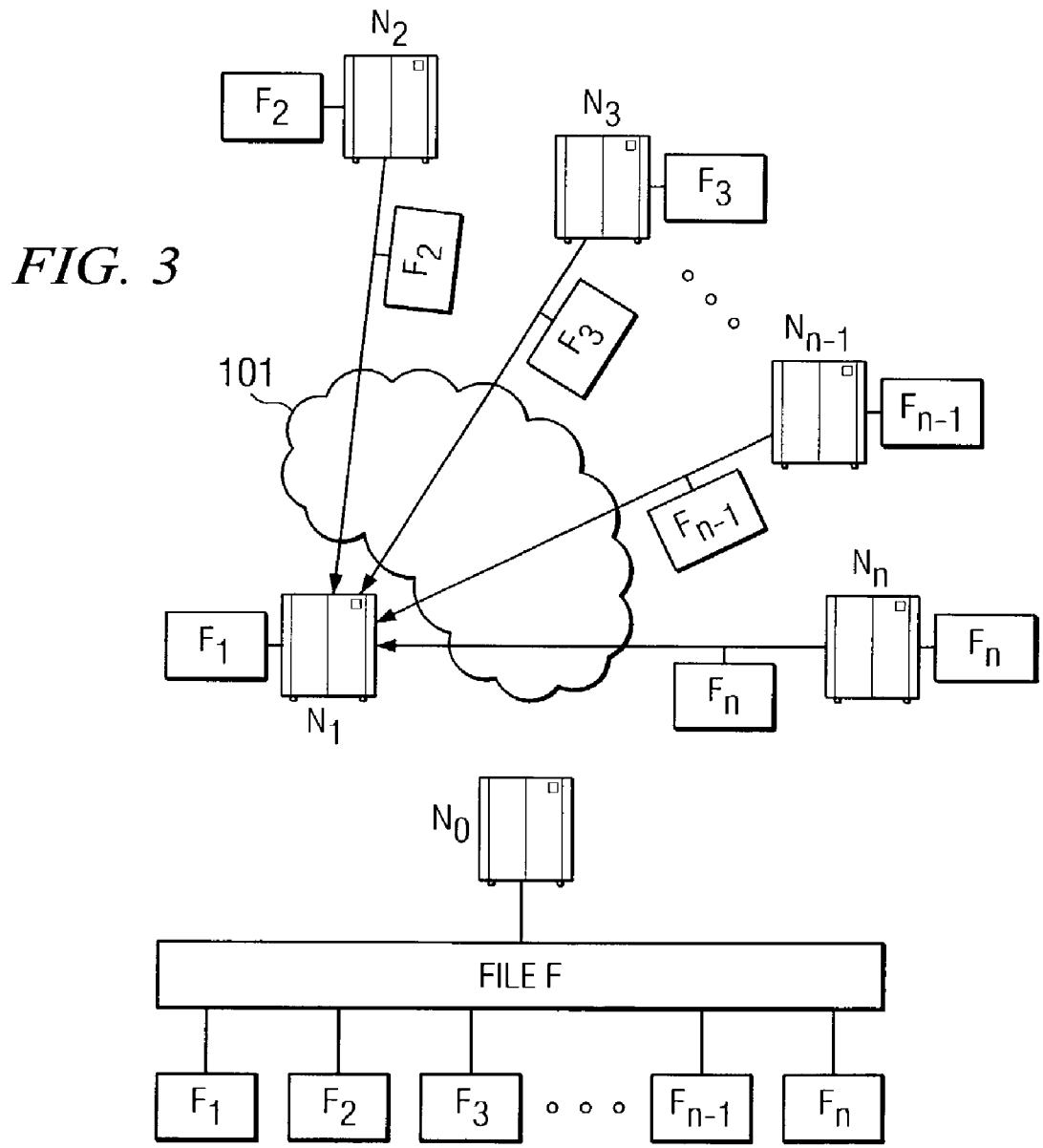
FIG. 3 shows an example of a recipient node receiving subfiles from each of the other recipient nodes in accordance with the file distribution technique of FIG. 1.

Similarly, FIG. 3 shows the set of incoming, concurrent connections to node $N_1$ from the remaining recipient nodes $N_2, \ldots, N_n$, transferring the complementary subfiles $F_2, \ldots, F_n$ during the collection step of the FastReplica algorithm. More particularly, FIG. 3 shows that node $N_1$ has n−1 concurrent network connections, i.e., one network connection with each of recipient nodes $N_2, \ldots, N_n$ through which node $N_1$ receives the other subfiles comprising file F from the recipient nodes $N_2, \ldots, N_n$. That is, each of recipient nodes $N_2, \ldots, N_n$ communicates its respective subfile that it received from origin node $N_0$ in the above-described distribution step to node $N_1$.

Thus at the end of this collection step, each node Ni has the following set of network connections:

(a) there are n−1 outgoing connections from node $N_i$: one connection to each node $N_k$ (k≠i) for sending the corresponding subfile $F_i$ to node $N_k$; and (b) there are n−1 incoming connections to node $N_i$: one connection from each node $N_k$ (k≠i) for sending the corresponding subfile $F_k$ to node $N_i$.

Thus, at the end of this collection step, each recipient node receives all subfiles $F_1, \ldots, F_n$ comprising the entire original file F. Accordingly, each of the nodes in the replication set R obtain the full file F (which is reconstructed through the received subfiles).

In view of the above, it should be recognized that instead of the typical replication of an entire file to n nodes by using n communication paths connecting the origin node $N_0$ to the replication group, the example FastReplica algorithm described above exploits n×n different communication paths within the replication group wherein each path is used for transferring $$\frac{1}{n}-th$$

of the file F. Thus, the impact of congestion on any particular communication path participating in the schema is limited for a transfer of $$\frac{1}{n}-th$$

of the file F. Additionally, the example FastReplica algorithm described above takes advantage of both the upload and download bandwidth of the recipient nodes. Typical servers in CDN environments have symmetrical upload and download bandwidth to be able to utilize this feature. Such FastReplica algorithm and its efficiency for various types of bandwidths that may be available between the nodes is discussed further in concurrently filed and commonly assigned U.S. patent application Ser. No. 10/345,716 titled "SYSTEM AND METHOD FOR EFFICIENTLY REPLICATING A FILE AMONG A PLURALITY OF RECIPIENTS", the disclosure of which is hereby incorporated herein by reference.

FIG. 4 shows an example operational flow diagram for distributing a file from an origin node to a plurality of recipient nodes in accordance with an embodiment of the present invention. In operational block 401, a number of subfiles into which file F is to be partitioned is determined. For instance, as shown in the example of FIGS. 1-3 above, in certain embodiments a FastReplica technique may be implemented in which file F may be partitioned into a number of subfiles corresponding to the number of recipient nodes n of a group to which the file F is to be distributed (if the number n of recipient nodes is sufficiently small such that each node $N_0, \ldots, N_n$ can support concurrent communication connections to all of the other n-1 nodes). In other implementations, the file F may be partitioned into a number of subfiles corresponding to the number k of concurrent communication connections that can be supported by each of the nodes $N_0, \ldots, N_n$ (wherein if k is less than the total number of recipient nodes n, then the distribution technique may be scaled for distribution to a plurality of groups of recipient nodes as described further below). In operational block 402, file F is partitioned into the determined number of subfiles.

In operational block 403, a subfile is distributed from an origin node to each recipient node, wherein all of the subfiles comprising file F are distributed to the recipient nodes. As shown, in certain embodiments block 403 may comprise operational block 403A, wherein a different subfile is distributed to each recipient node within the distribution group, as in the example of FIGS. 1-3 above in which the FastReplica technique is implemented. That is, each recipient node may receive a unique subfile from the origin node that is not received by any of the other recipient nodes within the distribution group.

In operational block 404, the recipient nodes exchange their respective subfiles such that each recipient node obtains all of the determined number of subfiles comprising file F. As shown, in certain embodiments block 404 may comprise operational block 404A wherein each recipient node sends its respective subfile received from the origin node to all other recipient nodes, as in the above-described FastReplica implementation.

In operational block 405, scaling operations may be performed, if needed. That is, if the number of recipient nodes is sufficiently large, the distribution process may be scaled to enable distribution to such a large number of recipient nodes. For instance, the distribution technique may be scaled to allow for a file distribution to hundreds, thousands, or tens of thousands, of recipient nodes, for example. More particularly, if it is determined that the number k of concurrent communication connections that can be supported by each of the nodes $N_0, \ldots, N_n$ is less than the total number of recipient nodes n, then the distribution technique may be scaled for distribution to a plurality of groups of recipient nodes as described further below. Various suitable scaling techniques may be utilized.

One scaling technique that may be implemented is described in concurrently filed and commonly assigned U.S. patent application Ser. No. 10/345,716 titled "SYSTEM AND METHOD FOR EFFICIENTLY REPLICATING A FILE AMONG A PLURALITY OF RECIPIENTS", the disclosure of which has been incorporated herein by reference. This first scaling technique that may be implemented is described herein below in conjunction with FIGS. 5-8.

According to this first scaling technique, the above-described FastReplica in the Small distribution strategy is generalized to a case in which a set of nodes to which file F is to be distributed is very large (e.g., hundreds, thousands, tens of thousands, or more of such recipient nodes). According to one example implementation of this scaling technique, let k be a number of network connections chosen for concurrent transfers between a single node and multiple recipient nodes (k limits the number of nodes in each distribution group for the above-described FastReplica strategy). An appropriate value of k can be experimentally determined for a given environment via probing, for example. Heterogeneous nodes might be capable of supporting a different number of connections, in which case the value of k may be a number of connections suitable for most of the nodes in the overall replication set.

File F is divided in k equal subsequent subfiles: $F_1, \ldots, F_k$, where $$Size(F_i) = \frac{Size(F)}{k}$$

bytes for each $1 \leq i \leq k$. This example scaling technique is described in conjunction with FIG. 5 in which $G^1\ G^2, \ldots, G^7$ are used to denote the replication groups of nodes, each group having k nodes. The boxes in the example of FIG. 5 reflect the node or group of nodes involved in the communications on a particular logical step of the algorithm. FIG. 5 provides an example in which 4 logical steps are performed in the scaled distribution process, but as will be recognized from the description of such scaled distribution process any other number of logical steps may be appropriate in other implementations (depending on the number of nodes to which the file F is being distributed).

First, in the example of FIG. 5, origin node $N_0$ opens k concurrent network connections to nodes $N_1^{\ 1}, \ldots, N_k^{\ 1}$ of group $G^1$, and sends sub file $F_i$ to the corresponding recipient node $N_i^{\ 1} (1 \leq i \leq k)$. This first step is represented by communication path(s) 501 to box $G^1$ (distribution) in FIG. 5 and is similar to the distribution step of FastReplica in the Small described above.

In the second step of this example scaled distribution algorithm:

(a) In group $G^1$, each node $N_i^{\ 1}$ sends its subfile $F_i$ to the rest of the nodes in group $G^1$. In this way, at the end of this step, each node in group $G^1$ has all subfiles $F_1, \ldots, F_k$ of original file F. This step is represented by communication path(s) 503 to box $G^1$ (collection) in FIG. 5 and is similar to the collection step of FastReplica in the Small described above. It should be noted that the activities performed in this second step are not synchronized between the different nodes of group $G^1$. Rather, Node $N_i^1$ starts transferring its subfile F to the remaining nodes of group $G^1$ independently of the similar step performed by the other nodes. This distributed nature of the FastReplica algorithm makes it more efficient. Thus, during the same physical time, the nodes in the group can perform different logical steps of the algorithm. For example, while some of the nodes of $G^1$ might be still finishing step 2 of the algorithm, some of the "faster" nodes of $G^1$ might start transfers related to step 3 of the algorithm (described below).

(b) In the same logical step (step 2), originator node $N_0$ opens k concurrent network connections to nodes $N_1^5, \ldots, N_k^5$ of group $G^5$, and using these i connections, it sends subfile $F_i$ to the corresponding recipient node $N_i^5$ in group $G^5$ $1 \leq i \leq k$. This step is represented by communication path(s) 502 to box $G^5$ (distribution) in FIG. 5.

Figure 6:
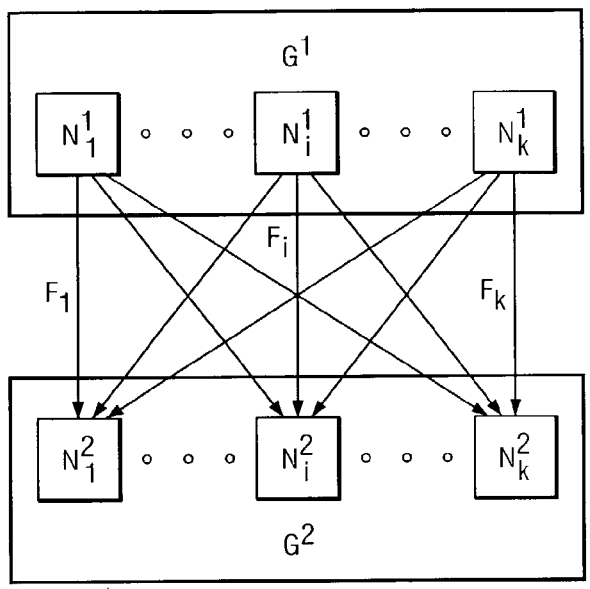
FIG. 6 shows communication paths between two groups of nodes in the scaled distribution process of FIG. 5.
Figure 7:
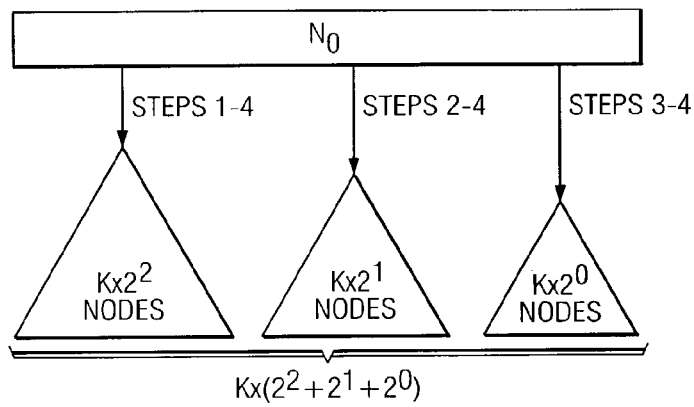
FIG. 7 shows a graphical representation of the number of recipient nodes to which a file F can be replicated in 4 logical steps in accordance with the scalable file distribution process of FIG. 5.

The above communications at steps 1 and 2 are similar to the communications defined in the example FastReplica in the Small algorithm described above. In step 3 of this example scaled distribution algorithm, the communications between groups $G^1$ and $G^2$ follow a different file exchange protocol defining another typical communication pattern actively used in the general FastReplica algorithm. Step 3 of FIG. 5 may be referred to herein as a general step, and includes the following operations:

(a) Each node $N_i^1$ of group $G^1$ opens k concurrent network connections to all k nodes of group $G^2$ for transferring its subfile $F_i$. In this way, at the end of this step, each node of group $G^2$ has all subfiles $F_1, \ldots, F_k$ of original file F. This step is represented by communication path(s) 505 to box $G^2$ in FIG. 5. The communications between the nodes in groups $G^1$ and $G^2$ are shown in more detail in FIG. 6. Turning briefly to FIG. 6, it can be seen that node $N_1^1$ of group $G^1$ distributes the subfile that it originally received from origin node $N_0$ (i.e., subfile $F_1$) to each of nodes $N_1^2, \ldots, N_k^2$ of group $G^2$ via concurrent communication connections therewith. Similarly, node $N_i^1$ of group $G^1$ distributes the subfile that it originally received from origin node $N_0$ (i.e., subfile $F_i$) to each of nodes $N_1^2, \ldots, N_k^2$ of group $G^2$ via concurrent communication connections therewith. Likewise, node $N_k^1$ of group $G^1$ distributes the subfile that it originally received from origin node $N_0$ (i.e., subfile $F_k$) to each of nodes $N_1^2, \ldots, N_k^2$ of group $G^2$ via concurrent communication connections therewith. Because of the manner in which each node $N_i^1$ of group $G^1$ opens k concurrent network connections to all k nodes of group $G^2$ for transferring its subfile Fi, this scaled distribution technique may be referred to as a "group-to-group" distribution technique. That is, because the nodes of a first group each communicate the respective subfile that they received from origin node $N_0$ to each of the nodes of a second group, the file is distributed directly from the first group to the second group without requiring exchange of information between the nodes of the second group.

(b) Also in logical step 3 of FIG. 5, in group $G^5$, each node $N_i^5$ sends its subfile Fi to the rest of the nodes in the group. In this way, at the end of this step, each node in group $G^5$ has all subfiles $F_1, \ldots, F_k$ of original file F. This step is represented by communication path(s) 506 to box $G^5$ (collection) in FIG. 5.

(c) At the same logical step 3 of FIG. 5, origin node $N_0$ opens k concurrent network connections to nodes $N_1^7, \ldots, N_k^7$ of group $G^7$, and using i connection, it sends the subfile $F_i$ to the corresponding recipient node $N_i^7$ in group $G^7$ ($1 \leq i \leq k$). This step is represented by communication path(s) 504 to box $G^7$ (distribution) in FIG. 5.

Next, logical step 4 is performed in this scaled distribution example of FIG. 5. Step 4 comprises the following operations:

(a) In group $G^2$, each node $N_i^2$ sends its subfile $F_i$ to all k nodes in group $G^3$ (in a manner as described above with FIG. 6). Thus at the end of this step, each node in group $G^3$ has all subfiles $F_1, \ldots, F_k$ of original file F. This step is represented by communication path(s) 509 to box $G^3$ in FIG. 5.

(b) In group $G^1$, each node $N_i^1$ sends its subfile $F_i$ to all k nodes in group $G^4$ (in a manner as described above with FIG. 6). In this way, at the end of this step, each node in group $G^4$ has all subfiles $F_1, \ldots, F_k$ of original file F. This step is represented by communication path(s) 508 to box $G^4$ in FIG. 5.

(c) In group $G^5$, each node $N_i^1$ opens k concurrent network connections to all k nodes of group $G^6$ for transferring its subfile $F_i$ (in a manner as described above with FIG. 6). At the end of this step, each node in the group $G^6$ has all subfiles $F_1, \ldots, F_k$ of original file F. This step is represented by communication path(s) 510 to box $G^6$ in FIG. 5.

(d) In the same logical step 4, in the group $G^7$, each node $N_i^1$ sends its subfile $F_1$ to the rest of the nodes in the group. In this way, at the end of this step, each node in group $G^6$ has all subfiles $F_1, \ldots, F_k$ of original file F. This step is represented by the communication path(s) 507 to box $G^7$ (collection) in FIG. 5, and is analogous to the collection step described above with the FastReplica in the Small algorithm.

A relatively simple induction rule defines the number of nodes to which the original file F can be replicated in 4 logical steps (such as the 4 logical steps of FIG. 5) in this first scalable distribution algorithm: $k \times (2^2 + 2^1 + 2^0)$, which is graphically shown in FIG. 7.

The example considered above with FIG. 5 can be generalized to the arbitrary number of algorithm steps i, where $i \geq 2$. The number of nodes to which original file F can be replicated in i algorithm steps is defined by the following formula:

$$k \times \sum_{j=2}^{i} 2^{i-j}.$$

From this binary representation, the rules for constructing the corresponding distribution lists of nodes are straightforward. Once the nodes to be included in a distribution list are determined, constructing such distribution lists may be performed in accordance with techniques well known in the art. That is, it is within the skill of those in the art to construct such a distribution list, and therefore the technical details of the distribution lists construction is not elaborated on further herein so as not to detract from the inventive features described herein for distributing a file from an origin node to a plurality of recipient nodes.

This first example scaling technique for the above-described FastReplica algorithm is based on the reasoning described above. Consider the problem of replicating file F across nodes $N_1, \ldots, N_n$ and let $$\frac{n}{k} = m.$$

Then, all of the nodes may be partitioned into m groups: $G^1, G^2, \ldots, G^m$, where each group has k nodes. Any number m can be represented as $m=2^{i_1}+2^{i_2}+\ldots+2^{i_j}$ (referred to herein as "Equation 1"), where $i_1 > i_2 > \ldots > i_j \geq 0$. Practically, this provides a binary representation of a number m. Then schematically, the above-described scalable FastReplica algorithm replicates file F to corresponding groups $G^1, G^2, \ldots, G^m$ in $i_1+2$ steps as graphically shown in FIG. 8.

Figure 8:
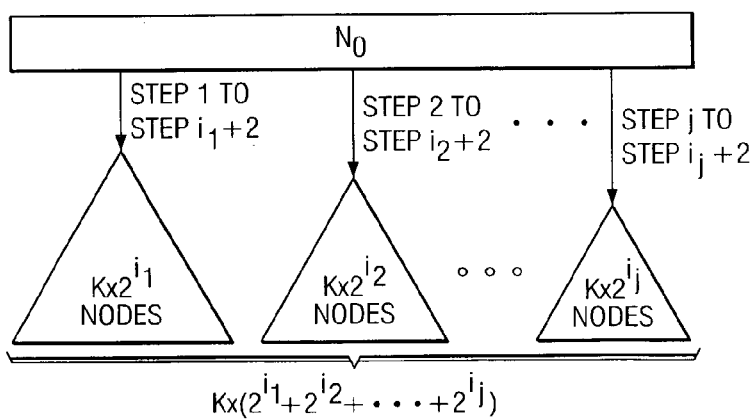
FIG. 8 shows a graphical representation of the number of recipient nodes to which a file F can be replicated in j logical steps in accordance with the scalable file distribution process of FIG. 5.

If the targeted number n of nodes for a file replication is not a multiple of k, i.e., $$\frac{n}{k} = m + r,$$

where r<k, then there is one "incomplete" group G' with r nodes in it. A preferred way to deal with this group in this first scaling technique is to arrange it to be a leaf-group in the biggest sub-tree (i.e., the sub-tree having the longest path from node $N_0$), which replicates the original file to $2^{i_1}$ groups as shown in FIG. 8, e.g., group G' is assigned group number $2^{i_1}$.

As an example, let k=10. How many algorithm steps are used in the example scalable FastReplica algorithm described above to replicate the original file F to 1000 nodes? Using Equation 1 above, we derive the following representation for 1000 nodes is derived: $1000=10\times(2^6+2^5+2^2)$. Thus, in 8 algorithm steps (each taking the $$\frac{1}{k} - th$$

portion of the file to transfer), the original file F will be replicated among all 1000 nodes.

Embodiments of the present invention improve the robustness (or "reliability") of the above-described file distribution process (e.g., the FastReplica algorithm) to deal with node failures. As can be seen from the above description of FastReplica, for example, such FastReplica algorithm is sensitive to node failures. For example, if node $N_1$ fails during the collection step shown in FIGS. 2 and 3, this event may impact all other nodes $N_2, \ldots, N_n$ in this distribution group because each node depends on node $N_1$ to receive subfile $F_1$. A similar situation occurs in the example scaled FastReplica algorithm described above, where a failure of node $N_i$ during a file replication may impact all the nodes in the dependent subtree because the nodes in such subtree should receive subfile $F_i$ from node $N_i$.

An embodiment of the present invention provides a reliable distribution technique (such as the above-described FastReplica distribution technique) that efficiently deals with node failures by making a local "repair decision" (which may be referred to herein as a local "distribution detour decision") within the particular group of nodes. As described below, an embodiment of the present invention, keeps the main structure of the FastReplica algorithm described above practically unchanged, while adding the desired property of resilience to node failures.

As an example of one embodiment, consider the nodes comprising group $G^1$ in the 4-step example discussed above in conjunction with FIG. 5. The nodes of $G^1$ are involved in different group communications at different steps of the example scaled FastReplica algorithm used therein. For instance, in the distribution step, the nodes of $G^1$ are involved in communication with origin node $N_0$, in which node $N_0$ communicates the subfiles comprising file F to the nodes of group $G^1$, shown in step 1 of FIG. 5 as distribution via communication path(s) 501 to box $G^1$ (Distribution). Further, in the collection step, the recipient nodes of $G^1$ are involved in communication with each other to exchange their respective subfiles, shown in step 2 of FIG. 5 as collection via communication path(s) 503 to box $G^1$ (Collection). Further still, in the example scaled distribution technique described with FIG. 5, the nodes of group $G^1$ are involved with communication to the nodes of group $G^2$ in step 3 (in the manner as shown in FIG. 6). Such distribution of file F from group $G^1$ to the nodes of group $G^2$ as shown in FIG. 6 may be referred to herein as a "general step" for ease of convenience in identifying this step from the distribution and collection steps described above.

In the example scaled distribution technique described with FIG. 5, there are three basic communication patterns in which a node of group $G^1$ might be involved at a moment of its failure:

1. Node $N_i^1$ of group $G^1$ may fail during Step 1 (the distribution step) shown in FIG. 5 while (or before) node $N_0$ is communicating subfile $F_i$ to node $N_i^1$. Only node $N_0$ has subfile $F_i$ at this point (none of the nodes in group $G^1$ has received this subfile $F_i$ yet). Since node $N_i^1$ is failed during (or before) the communication of subfile $F_i$ from $N_0$ to node $N_i^1$, node $N_0$ is aware of node $N_i^1$'s failure. For instance, node $N_0$ may receive an error message (e.g., it will get no "ACK" for sent packets and eventually a TCP timeout may be encountered) when attempting to communicate the subfile to node $N_i^1$ indicating to node $N_0$ that the communication of subfile $F_i$ to node $N_i^1$ was unsuccessful.

2. Node $N_i^1$ may fail during Step 2 (the collection step) shown in FIG. 5 after node $N_i^1$ has received subfile $F_i$ and before (or during) its transfer of such subfile $F_i$ to the remaining nodes in group $G^1$. In a worst case scenario, none of the nodes in group $G^1$ has received subfile $F_i$ at the time of node $N_i^1$'s failure.

3. Node $N_i^1$ may fail during Step 3 or Step 4 of FIG. 5 (the general steps). That is, node $N_i^1$ may fail when it is communicating subfile $F_i$ to the nodes of groups $G_2$ or $G_3$ correspondingly. The crucial difference of node $N_i^1$'s failure at this general step (e.g., step 3 or step 4 of FIG. 5) is that any node in group $G^1$ already has the entire file F, and in particular, the subfile $F_i$, at this point.

According to one embodiment of the present invention, the nodes within each distribution group $G^j = \{N_1^j, \ldots, N_k^j\}$ exchange heartbeat messages. Such heartbeat messages may be augmented with additional information on the corresponding algorithm step and group (list) of nodes to which they are currently responsible for performing. Table 1 shows an example heartbeat message that may be communicated by node $N_1^1$.

TABLE 1

| Node Identification | Node Status | Current Replication Step | Current Distribution List |
|---|---|---|---|
| $N^1_1$ | I'm Alive | Collection | Nodes $\{N^1_2, \ldots, N^1_k\}$ |

The information about the corresponding algorithm step currently being performed by a particular node in a group is included in the heartbeat message because of the distributed nature of the above-described FastReplica algorithm. For example, while some of the nodes of group $G^1$ can perform a file transfer corresponding to Step 3 (i.e., they are replicating their subfiles to the corresponding nodes of group $G^2$), some other "faster" nodes of the same group $G^1$ might already have started a file transfer corresponding to the next Step 4 (i.e., they-are replicating their subfiles to the corresponding nodes of group $G^4$.

Thus in case of node failure, it is desirable to know:
(a) which particular node in the group has failed;
(b) whether the corresponding step of the algorithm for which the failed node is currently responsible for performing is the distribution, collection, or general step; and
(c) which group and set of receiving nodes is impacted as a result of this failure.

Figure 9:
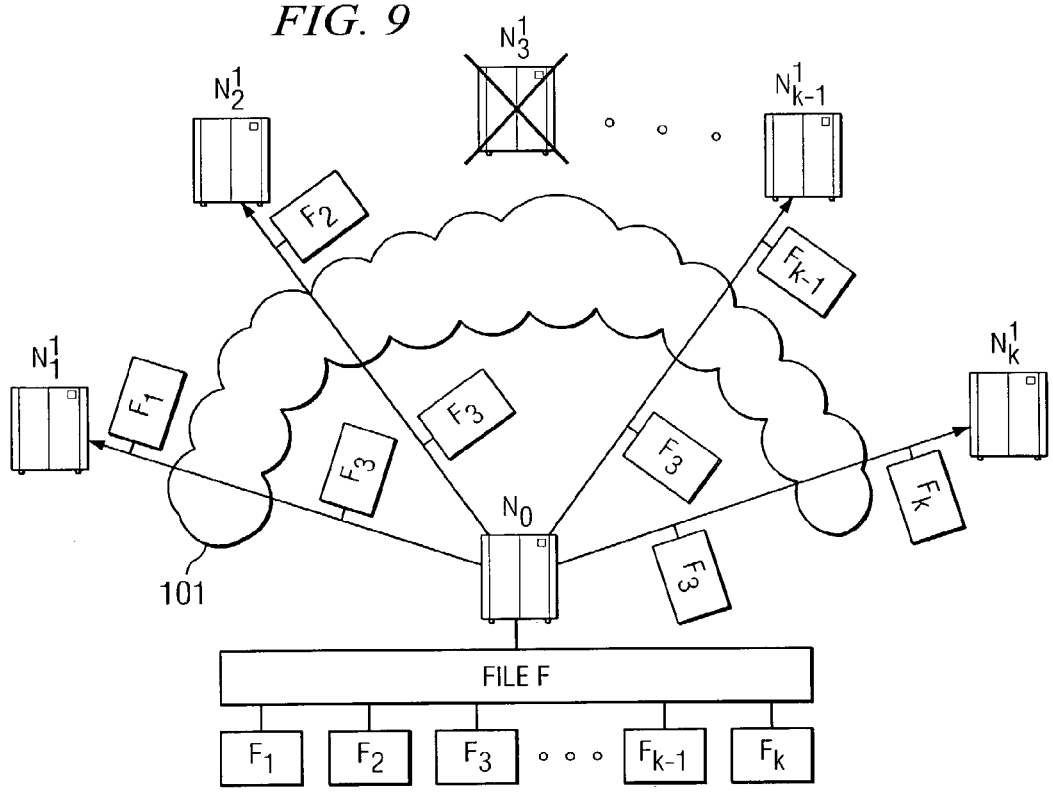
FIG. 9 shows an example in which a recipient node is failed during a distribution of subfiles from an origin node to recipient nodes, as in step 1 of the scalable file distribution process of FIG. 5, and an example technique for "repairing" the distribution of file F to the nodes of the distribution group.

According to an embodiment of the present invention, a different "repair procedure" may be utilized depending on whether the failed node is currently responsible for performing the distribution, collection, or general step in the FastReplica algorithm. First, consider when a node failure occurs during the distribution step of the above-described FastReplica algorithm. An example of such a node failure during the distribution step and an example technique for "repairing" the distribution of file F to the nodes of the distribution group is shown in FIG. 9. More specifically, FIG. 9 shows an example in which origin node $N_0$ is distributing subfiles $\{F_1, \ldots, F_k\}$ to recipient nodes $\{N_1^1, \ldots, N_k^1\}$ of group $G^1$, as in step 1 of FIG. 5. In the example of FIG. 9, node $N_3^{\;1}$ has failed. Accordingly, origin node $N_0$ is unable to communicate subfile $F_3$ to node $N_3^{\;1}$. In this case, node $N_0$ is aware of node $N_3^{\;1}$'s failure because it received an error message when attempting to communicate the subfile $F_3$ to node $N_3^{\;1}$ indicating to node $N_0$ that the communication of subfile $F_3$ to node $N_3^{\;1}$ was unsuccessful. Thus, in an embodiment of the present invention, origin node $N_0$ performs the following "repair" step (or "distribution detour"): it uses the k−1 already-opened communication connections to the rest of the nodes in group $G^1$ (i.e., the non-failed nodes $\{N_1^{\;1}, N_2^{\;1},$ and, $N_4^{\;1}, \ldots, N_k^{\;1}\}$) to send the missing $F_3$ subfile to each such non-failed node in group $G^1$, as shown in FIG. 9.

The process of enabling reliable distribution to non-failed nodes even when a failed node exists in a distribution group may be referred to as a "repair" of the distribution. Although, the failed node itself is not repaired by this process (but may instead remain in a failed state). Thus, the use of "repair" herein should not be confused with repairing an actual failed node, but is instead used as repairing a distribution process that is dependent on a failed node. This process may instead be referred to herein as a "detoured" distribution process. For instance, in the above example the subfile $F_3$ is distributed to the non-failed nodes via a detour around the failed node $N_3$.

Thus, after the above-described detoured distribution step, each of the non-failed nodes in group $G^1$ has all of the subfiles of original file F. However, until the failed node $N_3^{\;1}$ is itself repaired (such that it is no longer in a "failed" state), the remaining nodes of group $G^1$ continue to share the load of replicating file $F_3$ to nodes in the dependent subtree according to the general step's repair procedure described below.

Figure 10A:
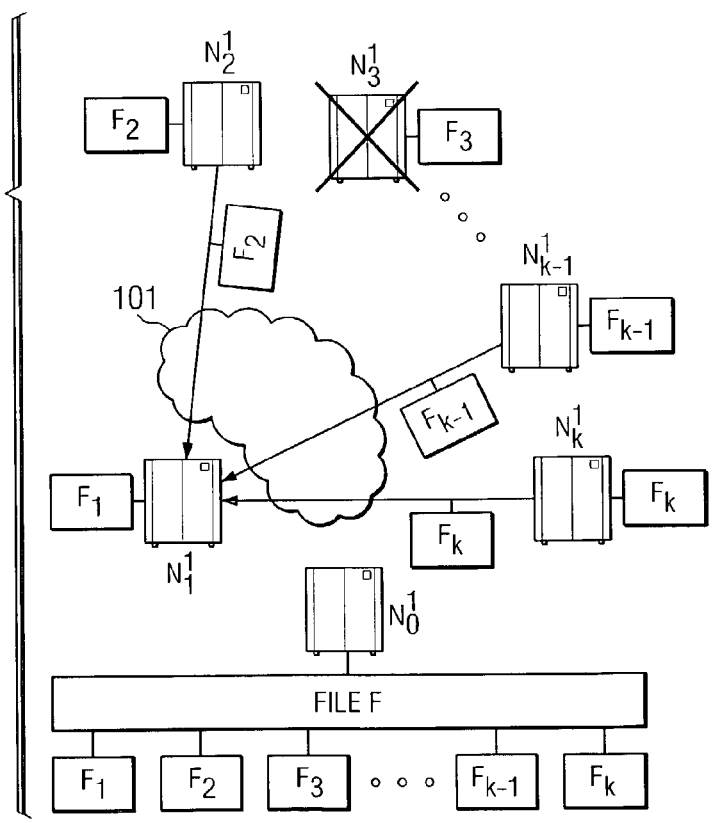
FIGS. 10A-10C show an example in which a recipient node fails during a collection step of the scaled file distribution process of FIG. 5, and an example technique for "repairing" the distribution of file F to the nodes of the distribution group.
Figure 10B:
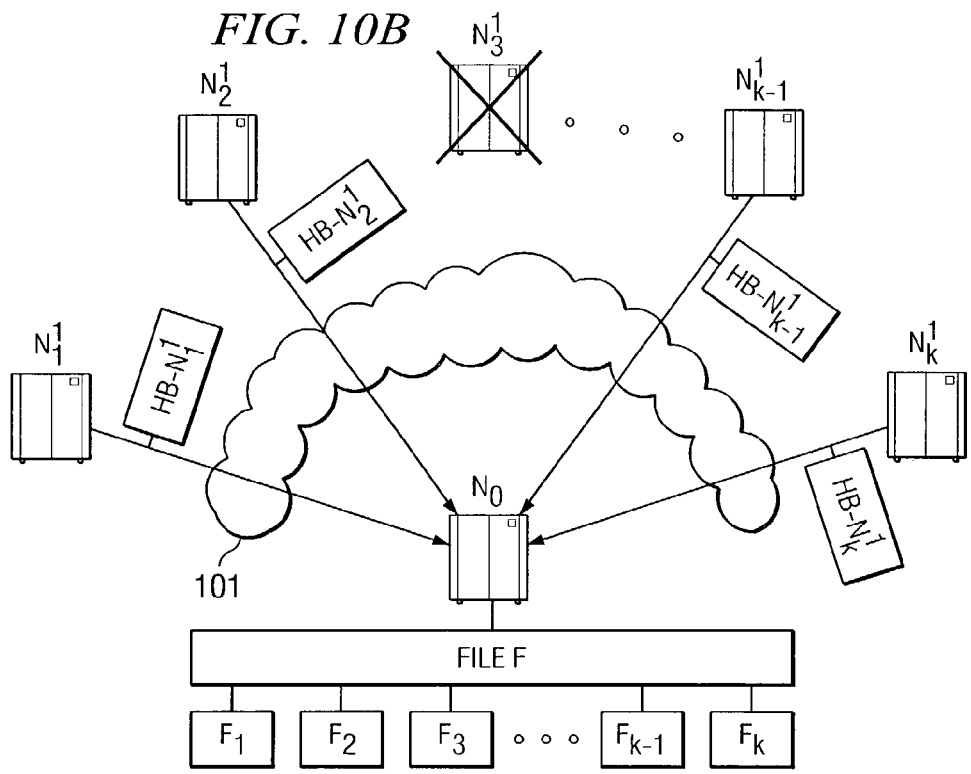
Figure 10C:
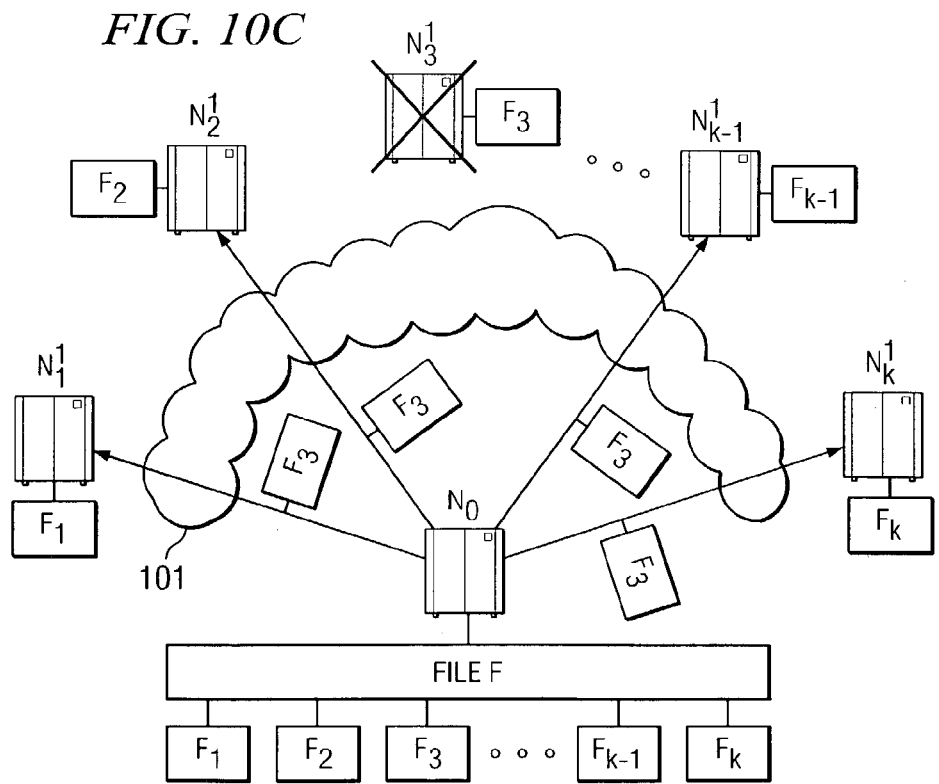

Consider instead now that a node failure occurs during the collection step of the FastReplica replication process. An example of such a node failure during the collection step and an example technique for "repairing" the replication of file F to the nodes of the replication group is shown in FIGS. 10A-10C. More specifically, FIG. 10A shows an example in which the nodes of group $G^1$ are performing the collection step, such as in step 2 of FIG. 5. For instance, as shown in the example of FIG. 10A, all of the non-failed nodes are communicating their respective subfiles to node $N_1^{\;1}$ (such as in the example collection process described above with FIG. 2). Of course, while not shown in FIG. 10A for conciseness, each of the non-failed nodes may have concurrent communication connections with each of the other non-failed nodes to concurrently exchange their respective subfiles. In the example of FIG. 10A, node $N_3^{\;1}$ has failed. In this case, node $N_3^{\;1}$ failed after the distribution of subfile $F_3$ to such node $N_3^{\;1}$ from origin node $N_0$. Thus, as shown, node $N_3^{\;1}$ has subfile $F_3$, but is unable to communicate such subfile $F_3$ to the other recipient nodes of group $G^1$. In this case, node $N_0$ is unaware of node $N_3^{\;1}$'s failure because the communication of subfile F3 to node $N_3^{\;1}$ has completed before node $N_3^{\;1}$ fails.

According to one embodiment of the present invention, heartbeat messages are used between the nodes of a distribution (e.g., group $G^1$ in the above example) to detect when one of the nodes fails. For instance, using the heartbeat messages of one embodiment, the failure of node $N_3^{\;1}$ is detected by nodes within group $G^1$, and this information is sent to node $N_0$. For example, each node of group G1 may periodically send a heartbeat message to node $N_0$, such as the example heartbeat message of Table 1, as shown in FIG. 10B. For instance, in the example of FIG. 10B, nodes $\{N_1^{\;1}, N_2^{\;1},$ and $N_4^{\;1}, \ldots, N_k^{\;1}\}$ send heartbeat messages $\{HB-N_1^{\;1}, HB-N_2^{\;1},$ and $HB-N_4^{\;1}, \ldots, HB-N_k^{\;1}\}$, respectively, to node $N_0$. Upon node $N_0$ recognizing that a heartbeat message is not received from node $N_3^{\;1}$, node $N_0$ detects that node $N_3^{\;1}$ has failed. As another example, in addition to or rather than the recipient nodes of group $G^1$ periodically sending heartbeat messages to their origin node $N_0$, such recipient nodes may exchange heartbeat messages with each other. For instance, the recipient nodes of a group (e.g., $G^1$) may exchange heartbeat messages with each other, and upon a recipient node detecting that another node of the group has failed (e.g., which may be detected by a heartbeat message from the failed node not being received in a given time frame) the detecting recipient node may notify the origin node of the failed node's failure. Once origin node $N_0$ detects a failed node (e.g., is notified of a node's failure by another recipient node in the group), in one embodiment of the present invention node $N_0$ performs the following repair (or "distribution detour") step: it opens connections to the impacted nodes in group $G^1$ to send missing file $F_3$ to such nodes, as shown in FIG. 1C.

Thus, after the above-described detoured distribution step of FIG. 1 ° C., each of the non-failed nodes in group $G^1$ has all of the subfiles of original file F. However, until the failed node $N_3^{\;1}$ is itself repaired (such that it is no longer in a "failed" state), the remaining nodes of group $G^1$ continue to share the load of replicating file $F_3$ to nodes in the dependent subtree according to the general step's repair procedure described below.

It should be recognized that the exchange of heartbeat messages by a "group" of nodes may be performed only during the distribution process in certain embodiments. For instance, recipient nodes may be logically "grouped" only for a distribution of a file F, and different distributions (of other files at other times) may comprise different logical groupings of the recipient nodes. Thus, the recipient nodes may exchange heartbeat messages with the other nodes of their group only during a distribution process, and once the distribution is complete, the nodes may no longer be "grouped" or exchange heartbeat messages.

Figure 11A:
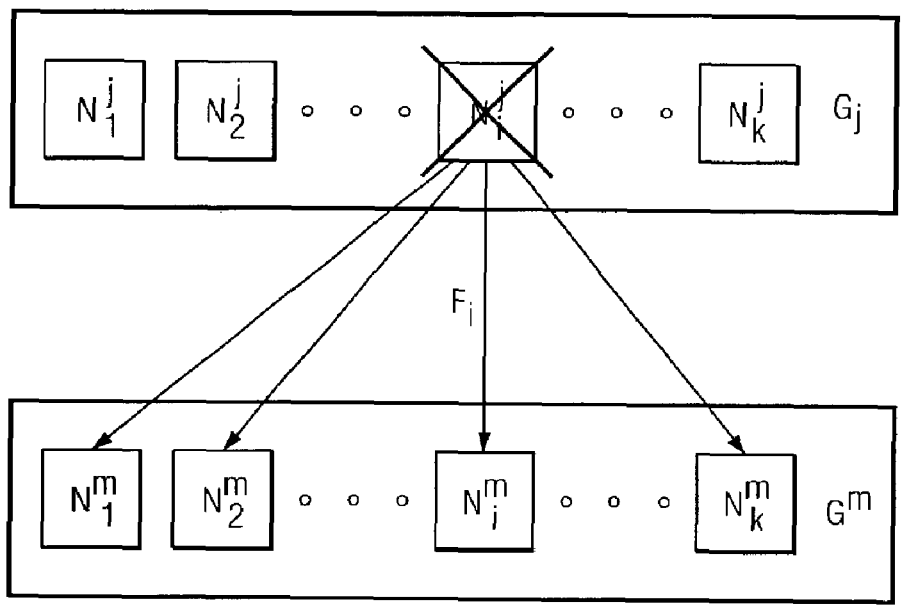
FIGS. 11A-11B show an example of a node failure in a general step of the scaled file distribution process of FIG. 5, and an example technique for "repairing" the distribution of file F to the nodes of the distribution group.
Figure 11B:
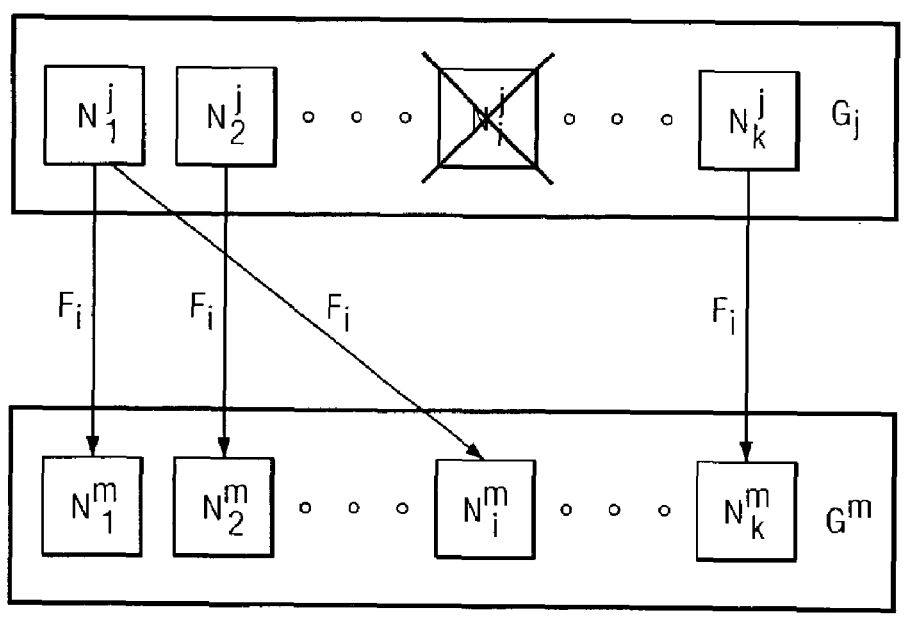

Now consider a node failure occurring during (or before) the general step of the scaled FastReplica distribution process of FIG. 5. An example of such a node failure in the general step of the scaled FastReplica distribution process and an example technique for "repairing" the distribution of file F to the nodes of the distribution group is shown in FIGS. 11A-11B. More specifically, FIG. 11A shows an example in which the nodes of group $G^j$ are distributing their respective subfiles to the nodes of group $G^m$ in general step s of the scaled FastReplica distribution process of FIG. 5. For instance, group $G^j$ may correspond to group $G^1$ and group $G^m$ may correspond to group $G^2$ in FIG. 5, wherein step s corresponds to step 3 of FIG. 5. As described in conjunction with the example scaled FastReplica distribution technique of FIG. 5, the nodes of group $G^j$ communicate their respective subfiles to the nodes of group $G^m$ in the manner described with FIG. 6 (i.e., a group-to-group distribution process). In the example of FIG. 11A, node $N_i^j$ of group $G^j$ has failed. As described above with FIG. 6, such node $N_i^j$ is suppose to communicate subfile $F_i$ to each of the nodes of group $G^m$ in the group-to-group distribution process of the example scaled FastReplica algorithm of FIG. 5. However, because such node $N_i^j$ has failed, it is unable to communicate subfile Fi to the nodes of group $G^m$.

Once it is detected by group $G^m$ that node $N_i^j$ has failed (e.g., through the above-described heartbeat messages), the remaining non-failed nodes in group $G^j$ share the additional load of communicating file $F_i$ to the nodes of group $G^m$. For instance, as shown in the example of FIG. 11B, in one embodiment, the non-failed node with smallest number in group $G^j$, say $N_1^j$, assumes the added responsibility of communicating file $F_i$ to its corresponding node $N_1^m$ of group $G^m$ and also to the node $N_i^m$ of group $G^m$ corresponding to the failed node $N_i^j$ of group $G^j$, while every other non-failed node $\{N_2^j, \ldots, N_{i-1}^j, \text{and } N_{i+1}^j, \ldots, N_k^j\}$ of group $G^j$ transfers file $F_i$ to their corresponding node $\{N_2^m, \ldots, N_{i-1}^m, \text{and } N_{i+1}^m, \ldots, N_k^m\}$. For instance, as shown in FIG. 11B, node $N_2^j$ assumes the added responsibility (in addition to communicating subfile $F_2$ to all nodes of group $G^j$ as discussed with FIG. 6) of communicating subfile $F_i$ to node $N_2^m$ of group $G^m$. Similarly, node $N_k^j$ assumes the added responsibility (in addition to communicating subfile $F_k$ to all nodes of group $G^j$ as discussed with FIG. 6) of communicating subfile $F_i$ to node $N_k^m$ of group $G^m$. Whereas, node $N_1^j$ assumes the added responsibility (in addition to communicating subfile $F_1$ to all nodes of group $G^j$ as discussed with FIG. 6) of communicating subfile $F_i$ to nodes $N_1^m$ and $N_i^m$ of group $G^m$.

The distribution lists are the same for all the nodes of group $G^m$, and after the "repair" step described above, the FastReplica algorithm proceeds in the usual way for the entire subtree originated in group $G^m$. The nodes in group $G^j$ having failed node $N_i^j$ continue to share the additional load of transferring file $F_i$ to all the other groups in the subtree dependent on group $G^j$ for all logical steps r of the algorithm such that r≧s or until node $N_i^j$ is repaired. Since the load of failed node $N_i^j$ is shared among the k−1 remaining non-failed nodes of group $G^j$, the performance degradation is gradual for the repaired portion of the distribution tree.

Figure 12A:
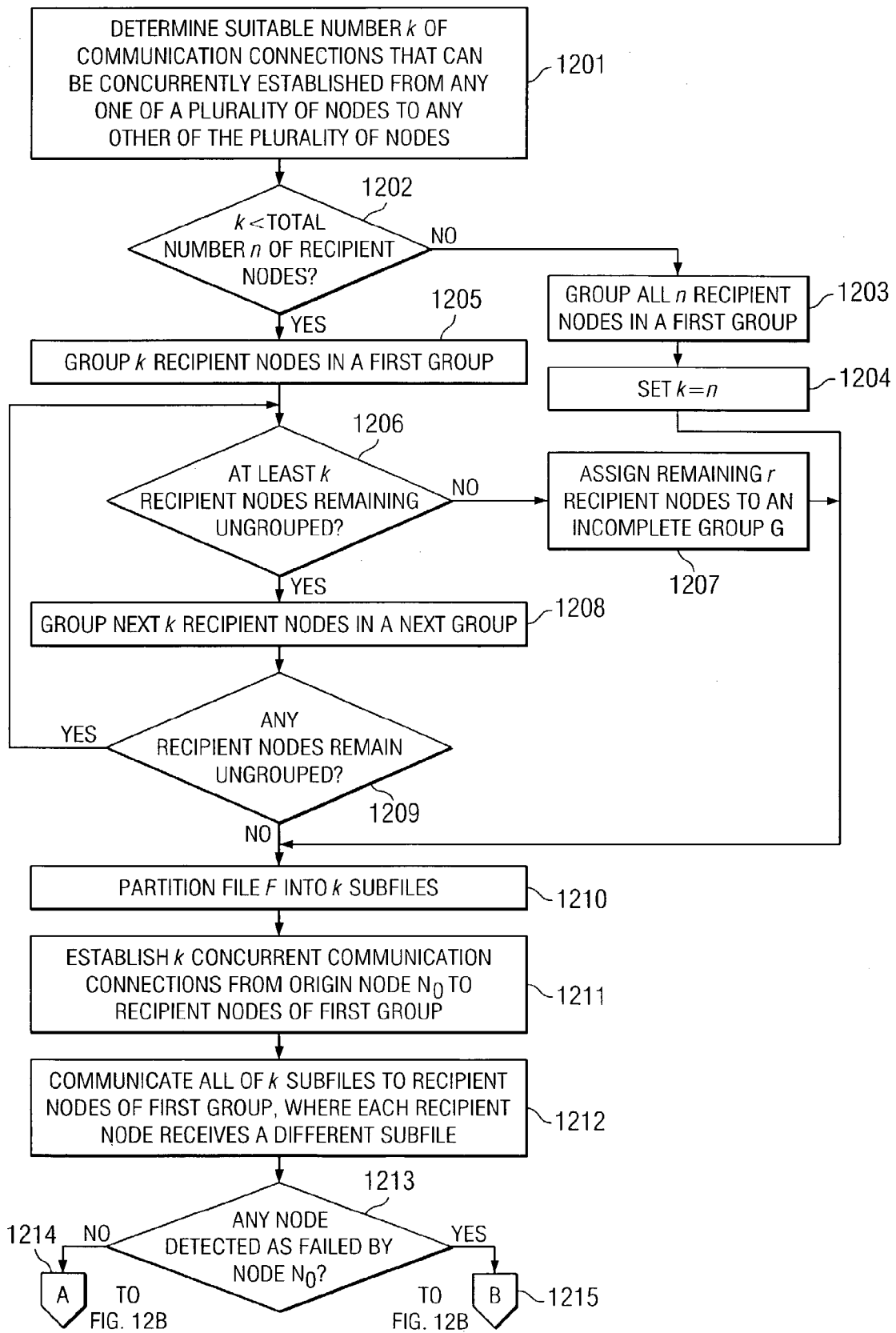
FIGS. 12A-12B show an example operational flow diagram for a scaled distribution process of FIG. 5 having improved reliability to account for failed nodes in accordance with an embodiment of the present invention.
Figure 12B:
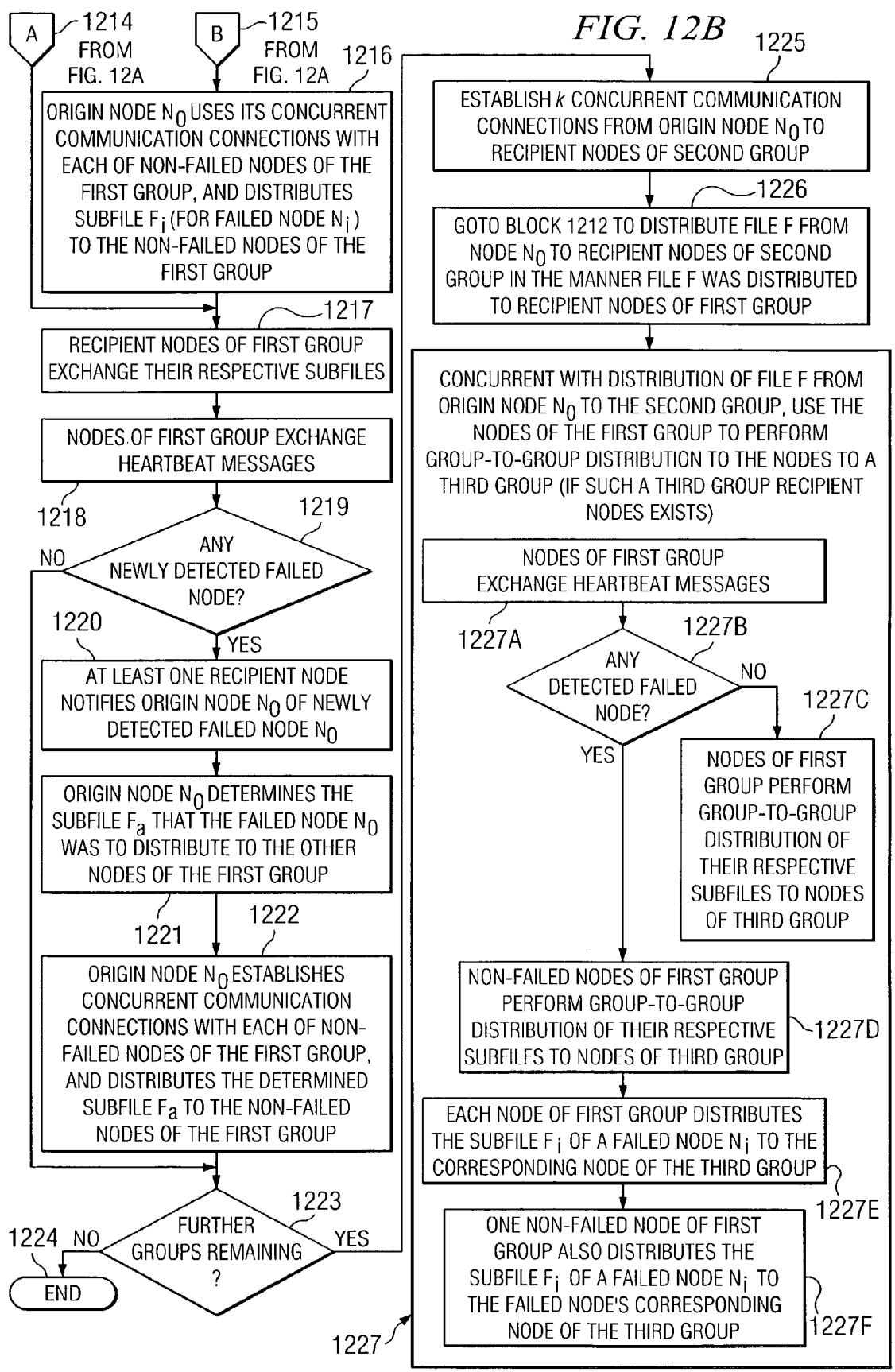

Turning to FIGS. 12A-12B, an example operational flow diagram is shown for a reliable, scaled FastReplica distribution process in accordance with an embodiment of the present invention. As shown in FIG. 12A, operation of this example embodiment starts with operational block 1201, whereat a suitable number k of communication connections that can be concurrently established from any one of a plurality of nodes $N_1, N_2, \ldots, N_n$ to which a file F is to be distributed to any other of the plurality of nodes is determined. In operational block 1202 it is determined whether k is less than the total number n of recipient nodes to which file F is to be distributed. If k is not less than the total number n of recipient nodes, then operation advances to block 1203 whereat all In of the recipient nodes are grouped into a first group of nodes. Then, in operational block 1204, k is set equal to n. That is, the number of concurrent communication connections that is established from any one of the nodes during distribution is set to n. Operation then advances from block 1204 to operational block 1210, which is described further below.

If, at operational block 1202, it is determined that k is less than the total number n of recipient nodes, then operation advances to block 1205 whereat the first k number of recipient nodes $N_1, N_2, \ldots, N_n$ (i.e., nodes $N, N_2, \ldots, N_k$) are grouped into a first group of nodes. Then, in operational block 1206 it is determined whether at least k recipient nodes remain ungrouped. If there are fewer than k recipient nodes remaining to be grouped, then operation advances to block 1207 whereat the remaining r recipient nodes (r<k) are grouped to an incomplete group G. Operation then advances from block 1207 to operational block 1210, which is described further below.

If, at operational block 1206, it is determined that at least k recipient nodes remain ungrouped, operation advances to block 1208 whereat the next k number of recipient nodes are grouped into a next group. Then, in operational block 1209, it is determined whether any recipient nodes remain ungrouped. If more recipient nodes do remain ungrouped, then operation returns to block 1206 to continue the logical grouping of the recipient nodes. If it is determined at operational block 1209 that no further recipient nodes remain ungrouped, then operation advances to block 1210.

At operational block 1210, file F is partitioned into k subfiles. In operational block 1211, origin node $N_0$ establishes k concurrent communication connections to the recipient nodes of the first group. Then, in operational block 1212, origin node $N_0$ communicates all of the k subfiles to the recipient nodes of the first group, wherein a different subfile is distributed to each recipient node (as in the distribution step of the above-described FastReplica distribution technique).

In operational block 1213, node $N_0$ determines whether any of the recipient nodes of the first group failed. That is, node $N_0$ determines whether any of the recipient nodes of the first group failed such that it was unable to distribute the node its respective subfile. If no failed node is detected by origin node $N_0$, then operation advances to FIG. 12B via linking block A 1214. If, on the other hand, a failed node is detected at operational block 1213, then operation advances to FIG. 12B via linking block B 1215.

Turning to FIG. 12B, if a failed node was detected by origin node $N_0$ in operational block 1213 then operation advances via linking block B 1215. At operational block 1216, for a detected failed node $N_i$ in the first group, origin node $N_0$ sends the subfile $F_i$ to each of the remaining non-failed nodes of the first group via the concurrent communication connections that node $N_0$ has established with each such non-failed node. For example, in FIG. 9 described above in which origin node $N_0$ detects node $N_3^1$ of a first group of recipient nodes as having failed, origin node $N_0$ communicates subfile $F_3$ to each remaining non-failed node of the first group. Operation then advances to block 1217 described below.

If a failed node was not detected by origin node $N_0$ in operational block 1213, then operation advances via linking block A 1214. At operational block 1217, the recipient nodes of the first group exchange their respective subfiles (as in the collection step of the above-described FastReplica distribution technique). In operational block 1218, the recipient nodes of the first group exchange heartbeat messages. While this exchange of heartbeat messages is shown at particular operational points of the example flow diagram of FIG. 12B, it should be recognized that such heartbeat messages may be periodically exchanged at a suitable interval and are not limited to being exchanged solely at the operational points identified in the example flow diagram of FIG. 12B. In operational block 1219, the recipient nodes of the first group determine from their exchange of heartbeat messages whether any recipient node in the group has failed.

If a recipient node is detected in operational block 1219 as having failed, operation advances to block 1220, whereat at least one of the recipient nodes of the first group notifies origin node $N_0$ of the detected failed node $N_a$. In operational block 1221, origin node $N_0$ determines the subfile $F_a$ that the failed node $N_a$ was to distribute to the other nodes of the first group. And, in operational block 1222, origin node $N_0$ establishes concurrent communication connections with each of the non-failed nodes of the first group, and distributes the determined subfile $F_a$ to the non-failed nodes of the first group. For example, as shown in the example of FIG. 10C in which node $N_3{}^1$ of a first group of recipient nodes fails during the collection step, origin node $N_0$ communicates subfile $F_3$ to each remaining non-failed node of the first group. Operation then advances to block 1223 described below.

If no node of the first group is detected as having failed in operational block 1219, then operation advances to block 1223. In block 1223, it is determined whether further groups remain that are to be distributed file F. If no further groups remain, then operation ends at block 1224. On the other hand, if further groups do remain, then in accordance with one scaling technique of the FastReplica algorithm, such as that described above with FIG. 5, operation advances to block 1225. At block 1225, origin node $N_0$ establishes k concurrent communication connections to the recipient nodes of a second group. Then, in operational block 1226, operation repeats the above-described distribution process of blocks 1212-1219 for distributing file F from origin node $N_0$ to the nodes of this second group in the same manner as described above for the first group.

Additionally, concurrent with such distribution of file F from origin node NO to the second group, the first group may be used in operational block 1227 to distribute file F to a third group, if such a third group of recipient nodes exists. As shown, in accordance with one embodiment of the present invention, operational block 1227 may comprise blocks 1227A-F described below. In operational block 1227A, the nodes of the first group exchange heartbeat messages. In operational block 1227B, the recipient nodes of the first group determine from their exchange of heartbeat messages whether any recipient node in the group has failed.

If no failed node is detected within the first group in operational block 1227B, operation advances to block 1227C, whereat the non-failed nodes of the first group perform a group-to-group distribution of their respective subfiles to the nodes of the third group, such as described with FIG. 6 above. If, on the other hand, a recipient node is detected in operational block 1227B as having failed, operation advances to block 1227D, whereat at non-failed nodes of the first group perform group-to-group distribution of their respective subfiles to the nodes of the third group, such as described with FIG. 6 above. Further, in block 1227E, each non-failed node of the first group distributes the subfile Fi of a failed node Ni to the corresponding node of the third group, such as described above with FIG. 11B. Additionally, in block 1227F, one non-failed node of the first group also distributes the subfile Fi of a failed node Ni to the failed node's corresponding node of the third group, such as described with FIG. 11B above (wherein node $N_i{}^j$ distributes subfile Fi for failed node Ni to the failed node's corresponding node $N_i{}^m$).

Operation may continue in a manner similar to that described above for even further groups in accordance with the scaling process shown in FIG. 5 until file F is distributed to all n of the nodes to which it is to be distributed. While FIGS. 12A-12B show one example reliable distribution process that enables reliable distribution of file F accounting for failed recipient nodes, various other reliable distribution techniques may be utilized in accordance with the distribution techniques described herein, and any such distribution techniques are intended to be within the scope of the present invention.

As one example application of embodiments of the present invention, consider the distribution of streaming media files within a CDN. In order to improve streaming media quality, the latest work in this direction proposes to stream video from multiple edge servers (or mirror sites), and in particular, by combining the benefits of multiple description coding (MDC) with Internet path diversity. MDC codes a media stream into multiple complementary descriptions. These descriptions have the property that if either description is received it can be used to decode the baseline quality video, and multiple descriptions can be used to decode improved quality video.

Thus, for a media file encoded with MDC, different descriptions can be treated as subfiles, and a distribution technique, such as the above-described FastReplica technique, can be applied to replicate them. That is, while the above examples describe partitioning a file into subfiles based, for example, on the number k of concurrent communication connections that can be supported by a node, in certain embodiments the distribution technique may be utilized with a file F encoded with multiple descriptions, wherein each of the multiple descriptions may be distributed to recipient nodes in the manner in which the above-described subfiles of a file F are described as being distributed.

Taking into account the nature of MDC (i.e., that either description received by the recipient node can be used to decode the baseline quality video), the reliability of the scaled FastReplica algorithm may be improved. For instance, when using the first scaling technique described above for distributing a media file encoded with MDC, even if failed nodes exist in the distribution tree, this first scaled FastReplica technique may provide a suitable distribution technique because receipt by nodes below the failed node(s) in the distribution tree of a portion of the descriptions (from the working nodes of the higher level) will be enough to decode the good quality video. That is, when using a group-to-group distribution technique, if one of the nodes in a first group responsible for distributing a particular subfile to the nodes of a second group fails, then the nodes of the second group will not receive this particular subfile. However, the nodes of the second group will still receive the subfiles from the working nodes of the first group, and with MDC encoding, such portion of the total number of subfiles may be sufficient to enable the nodes of the second group to decode the media file.

Various elements for performing the above-described file distribution functions of embodiments of the present invention may be implemented in software, hardware, firmware, or a combination thereof. For example, software may be used on an origin node $N_O$ for determining logical groupings of recipient nodes and/or for partitioning file F into the appropriate number of subfiles. As another example, network interfaces may be used to concurrently communicate subfiles from an origin node to recipient nodes of a distribution group (e.g., in the distribution step of FastReplica), as well as for communication of such subfiles between recipient nodes of the distribution group (e.g., in the collection step of FastReplica).

When implemented via computer-executable instructions, various elements of embodiments of the present invention for distributing file F from an origin node to recipient nodes are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information.

What is claimed is:

1. A method of distributing a file from a first node to a plurality of recipient nodes, the method comprising:
   partitioning a file F into a plurality of subfiles;
   performing distribution of said file F to a plurality of recipient nodes using a distribution technique that comprises
      (a) attempting to distribute the plurality of subfiles from a first node to a first group of recipient nodes, wherein the first node attempts to communicate at least one subfile to each recipient node of said first group but not all of said plurality of subfiles to any recipient node of said first group, and
      (b) said plurality of recipient nodes of said first group attempting to exchange their respective subfiles received from said first node;
   detecting a failed node; and
   said distribution technique to distribute said file F to each non-failed node of said plurality of recipient nodes.

2. The method of claim 1 wherein said distribution technique is responsive to said detecting a failed node.

3. The method of claim 1 wherein said attempting to distribute the plurality of subfiles from a first node to a first group of recipient nodes comprises:
   attempting to distribute a different subfile from said first node to each of said recipient nodes of said first group.

4. The method of claim 1 further comprising:
   determining a number of said subfiles to partition said file into.

5. The method of claim 4 wherein said determining comprises:
   determining a suitable number k of concurrent communication connections supported by any one of the nodes for concurrent communication with a plurality of the other nodes; and
   determining said number of subfiles as corresponding in number to said number k of concurrent communication connections.

6. The method of claim 1 further comprising:
   determining a number of said recipient nodes to include in said first group.

7. The method of claim 6 wherein said determining comprises:
   determining a suitable number k of concurrent communication connections supported by any one of the nodes for concurrent communication with a plurality of the other nodes; and
   determining said number of recipient nodes to include in said first group as corresponding in number to said number k of concurrent communication connections.

8. The method of claim 1 wherein said attempting to distribute the plurality of subfiles from a first node to a first group of recipient nodes comprises:
   attempting to distribute the plurality of subfiles from said first node to said plurality of recipient nodes of said first group concurrently.

9. The method of claim 1 wherein said plurality of recipient nodes of said first group attempting to exchange their respective subfiles further comprises:
   each of said plurality of recipient nodes attempting to establishing concurrent communication connections to every other recipient node of said first group.

10. The method of claim 1 wherein said detecting a failed node comprises said first node detecting a failed node in said first group such that said first node is unable to communicate a particular subfile to such failed node.

11. The method of claim 10 wherein said attempting to distribute the plurality of subfiles from a first node to a first group of recipient nodes comprises said first node attempting to establish concurrent communication connections to the recipient nodes of said first group, and wherein said distribution technique comprises:
   responsive to said first node detecting a failed node in said first group such that said first node is unable to communicate a particular subfile to such failed node, said first node using the established concurrent communication connections with non-failed nodes of said first group to communicate the particular subfile to said non-failed nodes.

12. The method of claim 1 wherein said detecting a failed node comprises said first node detecting a failed node in said first group after said first node has communicated a particular subfile to such failed node but before such failed node has communicated said particular subfile to every other recipient node of said first group.

13. The method of claim 12 wherein said distribution technique comprises:
   responsive to said first node detecting a failed node in said first group after said first node has communicated a particular subfile to such failed node but before such failed node has communicated said particular subfile to every other recipient node of said first group, said first node establishing concurrent communication connections with non-failed nodes of said first group that have not received the particular subfile from said failed node, and said first node communicating the particular subfile to said non-failed nodes.

14. The method of claim 12 wherein said detecting a failed node comprises:
   said recipient nodes of said first group exchanging heartbeat messages;
   at least one recipient node of said first group detecting a failed node from analysis of heartbeat messages received; and
   said at least one recipient node of said first group notifying said first node of said detected failed node.

15. The method of claim 1 further comprising:
   said first group of recipient nodes attempting to communicate said file F to a second group comprising a plurality of recipient nodes.

16. The method of claim 15 further comprising:
each recipient node of said first group attempting to communicate a subfile to every recipient node of said second group such that said recipient nodes of said second group each receive all of said plurality of subfiles comprising file F.

17. The method of claim 15 further comprising:
each recipient node of said first group attempting to communicate the subfile that the recipient node received from said first node to every node of the second group.

18. The method of claim 17 wherein each recipient node of said first group attempts to communicate the subfile that the recipient node received from said first node to every node of the second group concurrently.

19. The method of claim 17 wherein said detecting a failed node comprises detecting a failed node in said first group when said nodes of said first group are attempting to communicate said file F to the second group.

20. The method of claim 17 wherein if a recipient node of said first group is detected as failed, then said distribution technique comprises:
each non-failed recipient node of said first group communicating the subfile that it the non-failed recipient node received from said first node to every node of the second group; and
each non-failed recipient node of said first group communicating the subfile that the failed node received from said first node to a corresponding node of the second group.

21. The method of claim 20 wherein said distribution technique further comprises:
a recipient node of said first group communicating the subfile that the failed node received from said first node to a node of the second group corresponding to the failed node of the first group.

22. A system comprising:
means for partitioning a file F into a plurality of subfiles;
an origin node comprising means for performing distribution of said file F to a plurality of recipient nodes using a distribution technique that comprises
(a) attempting to distribute the plurality of subfiles from a first node to a first group of recipient nodes, wherein the first node attempts to communicate at least one subfile to each recipient node of said first group but not all of said plurality of subfiles to any recipient node of said first group, and
(b) said plurality of recipient nodes of said first group attempting to exchange their respective subfiles received from said first node;
means for detecting a failed node; and
said distribution technique, responsive to the detecting means detecting a failed node, to distribute said file F to each non-failed node of said plurality of recipient nodes.

23. The system of claim 22 wherein said attempting to distribute the plurality of subfiles from a first node to a first group of recipient nodes comprises:
attempting to distribute a different subfile from said first node to each of said recipient nodes of said first group.

24. The system of claim 22 wherein said attempting to distribute the plurality of subfiles from a first node to a first group of recipient nodes comprises:
attempting to distribute the plurality of subfiles from said first node to said plurality of recipient nodes of said first group concurrently.

25. The system of claim 22 wherein said plurality of recipient nodes of said first group attempting to exchange their respective subfiles further comprises:
each of said plurality of recipient nodes attempting to establishing concurrent communication connections to every other recipient node of said first group.

26. The system of claim 22 wherein said detecting means comprises:
means for said first node detecting a failed node in said first group.

27. The system of claim 26 wherein said means for said first node detecting a failed node in said first group comprises:
means for said first node detecting that said first node is unable to communicate a particular subfile to a node of said first group.

28. The system of claim 26 wherein said attempting to distribute the plurality of subfiles from a first node to a first group of recipient nodes comprises said first node attempting to establish concurrent communication connections to the recipient nodes of said first group, and wherein said distribution technique adapting comprises:
responsive to said means for said first node detecting a failed node in said first group such that said first node is unable to communicate a particular subfile to such failed node, said first node using the established concurrent communication connections with non-failed nodes of said first group to communicate the particular subfile to said non-failed nodes.

29. The system of claim 22 wherein said detecting means comprises:
means for said first node detecting a failed node in said first group after said first node has communicated a particular subfile to such failed node but before such failed node has communicated said particular subfile to every other recipient node of said first group.

30. The system of claim 29 wherein said distribution technique adapting comprises:
responsive to said means for said first node detecting a failed node in said first group after said first node has communicated a particular subfile to such failed node but before such failed node has communicated said particular subfile to every other recipient node of said first group, said first node establishing concurrent communication connections with non-failed nodes of said first group that have not received the particular subfile from said failed node, and said first node communicating the particular subfile to said non-failed nodes.

31. The system of claim 22 wherein said distribution technique further comprises:
said first group of recipient nodes attempting to communicate said file F to a second group comprising a plurality of recipient nodes.

32. The system of claim 31 wherein said distribution technique further comprises:
each recipient node of said first group attempting to communicate the subfile that it the recipient node received from said first node to every node of the second group.

33. The system of claim 32 wherein said detecting means comprises:
means for detecting a failed node in said first group when said nodes of said first group are attempting to communicate said file F to the second group.

34. The system of claim 32 wherein responsive to a recipient node of said first group being detected as failed, said distribution technique comprises:
each non-failed recipient node of said first group communicating the subfile that the non-failed recipient node received from said first node to every node of the second group; and each non-failed recipient node of said first group communicating the subfile that the failed node received from said first node to a corresponding node of the second group.

35. The system of claim 34 wherein said distribution technique further comprises:
a recipient node of said first group communicating the subfile that the failed node received from said first node to a node of the second group corresponding to the failed node of the first group.

36. A system comprising:
an origin node comprising a processor to partition a file F into a plurality of subfiles, wherein said plurality of subfiles correspond in number to a number of recipient nodes in a first group to which said file is to be distributed;
said origin node to attempt to distribute all of said plurality of subfiles to said recipient nodes, wherein said origin node attempts to distribute a different one of said plurality of subfiles to each of said recipient nodes;
said recipient nodes to attempt to exchange their respective subfiles received from said origin node such that each recipient node obtains all of said plurality of subfiles;
said origin node to detect a failed node in said first group; and
said origin node to manage distribution of said file F upon detecting a failed node in said first group in a manner such that every non-failed node of said first group receives said file F.

37. The system of claim 36 wherein said attempting to distribute the plurality of subfiles from said origin node to a first group of recipient nodes comprises:
attempting to distribute the plurality of subfiles from said origin node to said plurality of recipient nodes of said first group concurrently.

38. The system of claim 36 wherein said plurality of recipient nodes of said first group attempting to exchange their respective subfiles further comprises:
each of said plurality of recipient nodes attempting to establishing concurrent communication connections to every other recipient node of said first group.

39. The system of claim 36 wherein said origin node to detect a recipient node of said first group as failed based at least in part on said origin node being unable to communicate a particular subfile to such recipient node.

40. The system of claim 36 wherein said attempting to distribute the plurality of subfiles from said origin node to said first group of recipient nodes comprises said origin node attempting to establish concurrent communication connections to the recipient nodes of said first group, and wherein said responsive to said origin node detecting a failed node in said first group such that said origin node is unable to communicate a particular subfile to such failed node, said origin node using the established concurrent communication connections with non-failed nodes of said first group to communicate the particular subfile to said non-failed nodes.

41. The system of claim 36 wherein said origin node to detect a failed node in said first group after said origin node has communicated a particular subfile to such failed node but before such failed node has communicated said particular subfile to every other recipient node of said first group.

42. The system of claim 41 wherein responsive to said origin node detecting a failed node in said first group after said origin node has communicated a particular subfile to such failed node but before such failed node has communicated said particular subfile to every other recipient node of said first group, said origin node establishing concurrent communication connections with non-failed nodes of said first group that have not received the particular subfile from said failed node, and said origin node communicating the particular subfile to said non-failed nodes.

43. The system of claim 31 wherein said first group of recipient nodes attempt to communicate said file F to a second group comprising a plurality of recipient nodes.

44. The system of claim 43 wherein each recipient node of said first group to attempt to communicate the subfile that the recipient node received from said origin node to every node of the second group.

45. The system of claim 44 wherein said recipient nodes of said first group to further detect a failed node in said first group when said nodes of said first group are attempting to communicate said file F to the second group.

46. The system of claim 45 wherein responsive to a recipient node of said first group being detected as failed, each non-failed recipient node of said first group is operable to communicate the subfile that the non-failed recipient node received from said origin node to every node of the second group, and each non-failed recipient node of said first group to communicate the subfile that the failed node received from said origin node to a corresponding node of the second group.

47. The system of claim 46 wherein a recipient node of said first group to further communicate the subfile that the failed node received from said origin node to a node of the second group corresponding to the failed node of the first group.

48. The method of claim 1 wherein said plurality of recipient nodes of said first group attempting to exchange their respective subfiles received from said first node comprises:
said plurality of recipient nodes of said first group attempting to exchange their respective subfiles received from said first node such that each of said plurality of recipient nodes of said first group obtains all of said plurality of subfiles.

49. The system of claim 22, wherein said plurality of recipient nodes of said first group attempting to exchange their respective subfiles received from said first node comprises:
said plurality of recipient nodes of said first group attempting to exchange their respective subfiles received from said first node such that each recipient node obtains all of said plurality of subfiles.

* * * * *

UNITED STATES PATENT AND TRADEMARK OFFICE
CERTIFICATE OF CORRECTION

PATENT NO. : 7,512,701 B2 Page 1 of 1
APPLICATION NO. : 10/345587
DATED : March 31, 2009
INVENTOR(S) : Ludmila Cherkasova It is certified that error appears in the above-identified patent and that said Letters Patent is hereby corrected as shown below:

In column 8, line 34, delete "$N_{21}$" and insert -- $N_2$ --, therefor.

In column 18, line 11, after "all" delete "In" and insert -- n --, therefor.

In column 18, line 21, delete "nodes N," and insert -- nodes $N_1$, --, therefor.

In column 23, line 62, in Claim 24, delete "subflles" and insert -- subfiles --, therefor.

In column 24, line 54, in Claim 32, after "that" delete "it".

Signed and Sealed this

Fourth Day of August, 2009

JOHN DOLL
*Acting Director of the United States Patent and Trademark Office*